United States Patent
Kamakura

(10) Patent No.: US 9,071,602 B2
(45) Date of Patent: Jun. 30, 2015

(54) BIOMETRIC AUTHENTICATION SYSTEM AND BIOMETRIC AUTHENTICATION METHOD

(75) Inventor: Ken Kamakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 13/492,242

(22) Filed: Jun. 8, 2012

(65) Prior Publication Data

US 2012/0291111 A1 Nov. 15, 2012

Related U.S. Application Data

(63) Continuation of application No. PCT/JP2009/070507, filed on Dec. 8, 2009.

(51) Int. Cl.
*G06F 21/00* (2013.01)
*H04L 29/06* (2006.01)
*G06F 21/32* (2013.01)
*G06K 9/00* (2006.01)
(Continued)

(52) U.S. Cl.
CPC ............ *H04L 63/0861* (2013.01); *G06F 21/32* (2013.01); *G06K 9/00979* (2013.01); *H04L 9/3231* (2013.01); *G07C 9/00166* (2013.01); *G07C 9/00158* (2013.01); *H04L 2209/60* (2013.01); *G07C 2209/12* (2013.01)

(58) Field of Classification Search
CPC .... G06F 21/32; H04L 9/3231; H04L 2209/60
USPC ............ 726/7, 5; 713/186; 382/115, 116, 125
See application file for complete search history.

(56) References Cited

U.S. PATENT DOCUMENTS

| 5,802,199 A | * | 9/1998 | Pare et al. ...................... 382/115 |
| 2004/0086157 A1 | * | 5/2004 | Sukegawa ...................... 382/115 |
| 2006/0050932 A1 | * | 3/2006 | Tumey et al. .................. 382/116 |

(Continued)

FOREIGN PATENT DOCUMENTS

| JP | 10-187984 | 7/1998 |
| JP | 2000-163585 | 6/2000 |

(Continued)

OTHER PUBLICATIONS

Uludag, Umut, Arun Ross, and Anil Jain. "Biometric template selection and update a case study in fingerprints." Pattern Recognition 37.7 (2004): 1533-1542.*

(Continued)

*Primary Examiner* — Syed Zaidi
(74) *Attorney, Agent, or Firm* — Staas & Halsey LLP

(57) ABSTRACT

A biometric authentication method is executed by a biometric authentication system comprising a server device to store biometric data of a plurality of users in a registering unit; and a client device to retain the biometric data sampled from the user and authenticated by the server device in a retaining unit together with user information. The method comprises verifying the biometric data sampled from the user with the cache biometric data retained in the retaining unit when in authentication; acquiring synthesized information of the cache biometric data of which the verification gets successful and the biometric data sampled from the user; and authenticating the synthesized information by use of the biometric data specified by the user information of the biometric data of which the verification gets successful in plural sets of biometric data registered in the registering unit.

11 Claims, 20 Drawing Sheets

(51) Int. Cl.
  *H04L 9/32*   (2006.01)
  *G07C 9/00*   (2006.01)

(56)     References Cited

U.S. PATENT DOCUMENTS

| 2006/0206722 | A1  | 9/2006  | Zhang |
| 2007/0286465 | A1* | 12/2007 | Takahashi et al. ............ 382/125 |
| 2007/0294540 | A1* | 12/2007 | Wadayama .................... 713/186 |
| 2008/0172725 | A1* | 7/2008  | Fujii et al. .......................... 726/5 |
| 2008/0244756 | A1  | 10/2008 | Kitada |
| 2009/0157802 | A1  | 6/2009  | Kang et al. |
| 2010/0097179 | A1  | 4/2010  | Hayashida |

FOREIGN PATENT DOCUMENTS

| JP | 2001-256191    | 9/2001  |
| JP | 2003-044442    | 2/2003  |
| JP | 2003-44442     | 2/2003  |
| JP | 2003-316746    | 11/2003 |
| JP | 2004-258963    | 9/2004  |
| JP | 2006-158851    | 6/2006  |
| JP | 2008-197895    | 8/2008  |
| JP | 2008-242851    | 10/2008 |
| WO | WO 2009/008051 | 1/2009  |

OTHER PUBLICATIONS

PCT Form PCT/IB/338 for International Application No. PCT/JP2009/070507 mailed Jul. 19, 2012.

International Search Report of Corresponding PCT Application PCT/JP2009/070507 mailed Dec. 30, 2010.

Extended European Search Report mailed Mar. 20, 2014 in corresponding European Application No. 09852043.0.

\* cited by examiner

FIG.7

| USER ID | REFERENCE BIOMETRIC DATA | MATCH RATE DECREASE FLAG |
|---|---|---|
| A0001 | · · · | ON (DECREASE) |
| A0002 | · · · | OFF (NO CHANGE) |
| A0003 | · · · | OFF |
| A0004 | · · · | OFF |
| : | : | : |

FIG.8

| USER ID | MATCH RATE | AUTHENTICATION DATE/TIME |
|---------|------------|--------------------------|
| A0001 | 0.90 | 2009/2/01 09:10:05 |
| A0001 | 0.85 | 2009/2/02 09:11:35 |
| A0001 | 0.82 | 2009/2/03 09:05:16 |
| A0001 | 0.77 | 2009/2/04 09:01:00 |
| : | : | : |

FIG.11

| USER ID | CACHE BIOMETRIC DATA | MATCH RATE |
|---|---|---|
| A0001 | · · · | 0.90 |
| A0001 | · · · | 0.85 |
| A0001 | · · · | 0.82 |
| A0001 | · · · | 0.77 |
| A0001 | · · · | 0.90 |
| A0002 | · · · | 0.86 |
| A0002 | · · · | 0.60 |
| A0002 | · · · | 0.55 |
| : | : | : |

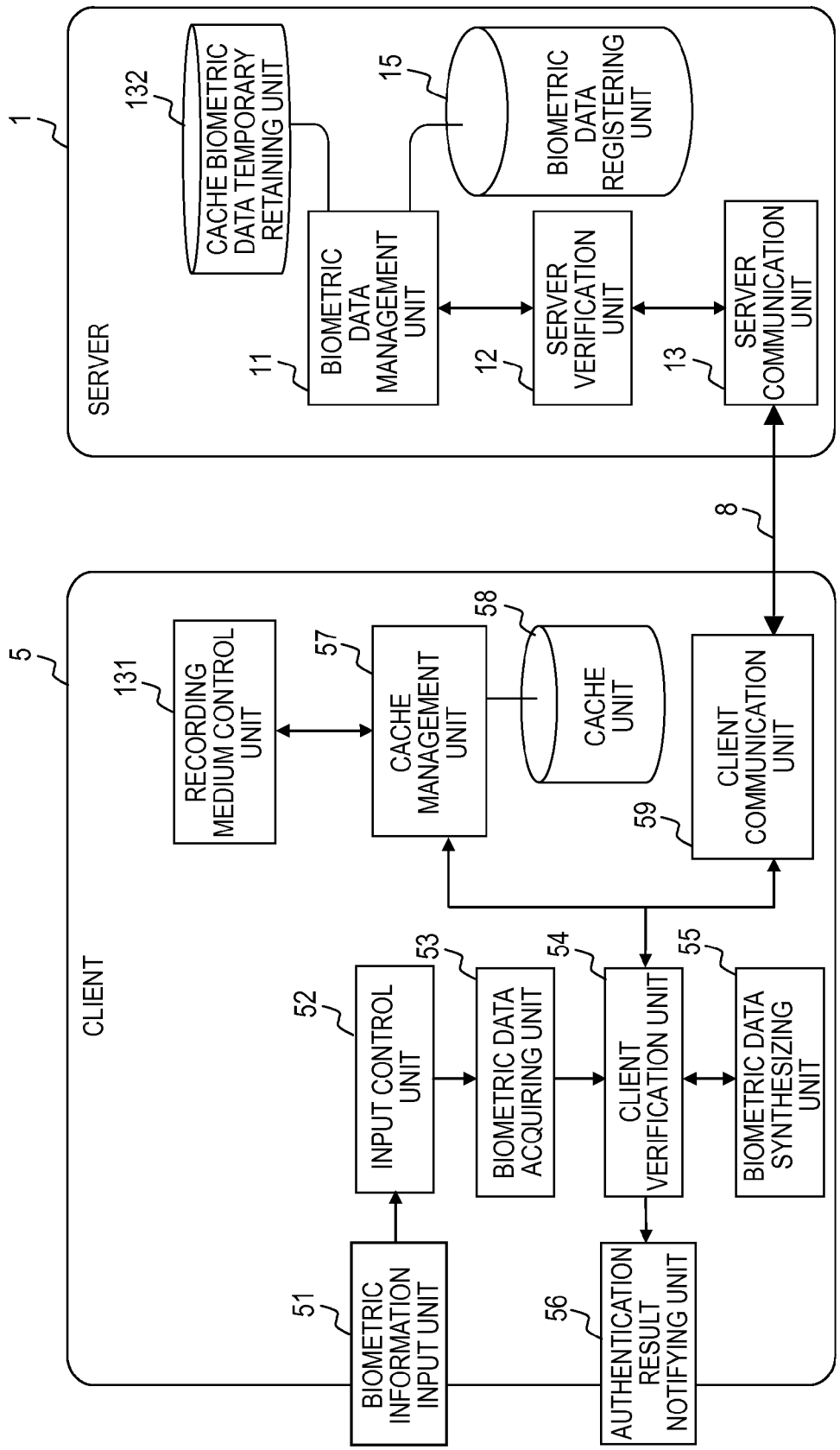

FIG.14

| USER ID | REFERENCE BIOMETRIC DATA | REGISTRATION DATE/TIME |
|---|---|---|
| A0001 | · · · | 2009/2/01 09:10:05 |
| A0002 | · · · | 2009/2/02 09:11:35 |
| A0003 | · · · | 2009/2/03 09:05:16 |
| A0004 | · · · | 2009/2/04 09:01:00 |
| : | : | : |

FIG.15

| USER ID | CACHE BIOMETRIC DATA | CACHE DATE/TIME |
|---|---|---|
| A0001 | ・・・ | 2009/2/01 09:10:05 |
| A0003 | ・・・ | 2009/2/03 09:05:16 |
| : | : | : |

BIOMETRIC AUTHENTICATION SYSTEM AND BIOMETRIC AUTHENTICATION METHOD

CROSS-REFERENCE TO RELATED APPLICATION

This is a continuation of Application, filed under 35 U.S.C. §111 (a) of International Application PCT/JP2009/070507, filed on Dec. 8, 2009, the contents of which are herein wholly incorporated by reference.

FIELD

The present invention relates to a client server type of biometric authentication technology.

BACKGROUND

In biometric authentication based on a one-to-many identification method not using individual identifying information such as a user ID (identification), the inputted biometric data is verified with all the registered biometric data. Authentication in the one-to-many identification method not using the individual identifying information such as this will hereinafter be termed one-to-many authentication. This one-to-many authentication method has a tendency which depends on performance of a server device in terms of processing time and a processing load.

Further, biometric information varies corresponding to biometric changes due to variations in condition of the living body and ageing. There is a case in which even a valid identical person registered in the system might fail to be authenticated due to the variations in biometric information such as this and a dispersion in method of using an authentication device. Under this circumstance, the one-to-many authentication involves verification the inputted biometric information of the identical person with the biometric information of a different person, and therefore a system threshold of the matching is set high. A rise in the system threshold of the matching, however, leads to an increase false rejection rate in identical person as the case may be.

DOCUMENTS OF PRIOR ARTS

Patent Document

[Patent document 1] Japanese Patent Application Laid-Open Publication No. 2003-44442
[Patent document 2] Japanese Patent Application Laid-Open Publication No. 2004-258963

SUMMARY

Problems to be Solved by the Invention

There was a case where the prior arts disclosed in the documents of the prior arts did not lead to a decrease in processing load on the system using the one-to-many authentication method not employing the individual identifying information. Further, a quality of the data used for the update was not determined when an authentication rate decreases, and hence there was a risk that the cache data might have been rewritten into data for verifying a different person because of overlooking a masquerade.

Further, in the prior art, the biometric data retained in the server device was copied to a cache memory of a client, and therefore such a problem arose that a risk against a leakage of the biometric data increased. Moreover, in a system which determined the authentication from only the cache data retained in the client in response to an authentication request from the second time onward, it was difficult to make the determination in such a case that the registration of the user making a request for the authentication was deleted from the system, and, if failing to be authenticated in the system using the one-to-many authentication method, it was difficult to determine whether the user is a user not related to the system or a user whose registration was deleted, resulting in a difficulty of automating a process of ensuring consistency between the biometric data maintained and managed by the server device and the cache data of the client device.

It is an object according to one aspect of the present invention in view of the problems described above to provide a biometric authentication technology of a client-to-server type exhibiting high accuracy.

Means for Solving the Problems

Each of the aspects of the present invention adopts the following configuration in order to solve the problems described above.

A first aspect relates to a biometric authentication system including: a server device to store biometric data of a plurality of users in a registering unit; and a client device to sample the biometric data from the users, the system being configured to authenticate the sampled biometric data by use of biometric data registered in the registering unit. In the biometric authentication system according to the first aspect, the client device includes: a retaining unit to retain the biometric data sampled by the client device and authenticated by the server device as cache biometric data together with user information; a client verification unit to verify the biometric data sampled from the user with the cache biometric data when in authentication; and a synthesizing unit to acquire synthesized information of the cache biometric data of which the verification gets successful and the biometric data sampled from the user; and a transmitting unit to transmit user information of the biometric data of which the verification gets successful and the synthesized information to the server device, and the server device includes: a server verification unit to verify the biometric data specified by the user information sent from the client device in plural sets of biometric data registered in the registering unit with the synthesized information sent from the client device.

It is to be noted that a method for realizing the configuration described above, a program, a non-transitory computer-readable storage medium recorded with this program, etc are given by way of other aspects of the present.

Effects of the Invention

According to the respective aspects, it is possible to provide the biometric authentication technology of the client-to-server type exhibiting the high accuracy.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 is a diagram illustrating an example of data stored on a biometric data registering unit 15.

FIG. 8 is a diagram illustrating an example of data stored on a match rate history storage unit 62.

FIG. 11 is a diagram illustrating an example of the data cached in a cache unit 58 in a third embodiment.

FIG. 13 is a block diagram illustrating an outline of an architecture of the biometric authentication system in a fourth embodiment.

FIG. 14 is a diagram illustrating an example of a biometric data registering unit 15 in the fourth embodiment.

FIG. 15 is a diagram illustrating an example of the cache unit 58 in the fourth embodiment.

DESCRIPTION OF EMBODIMENTS

A biometric authentication system will hereinafter be described by way of an embodiment in a way that gives a specific example. The biometric authentication system given by way of the embodiment is applied to a variety of scenes for authenticating individuals. Respective embodiments given as below are exemplifications, and the present embodiment is not limited to configurations of the following embodiments.

[First Embodiment]

Figure 1:
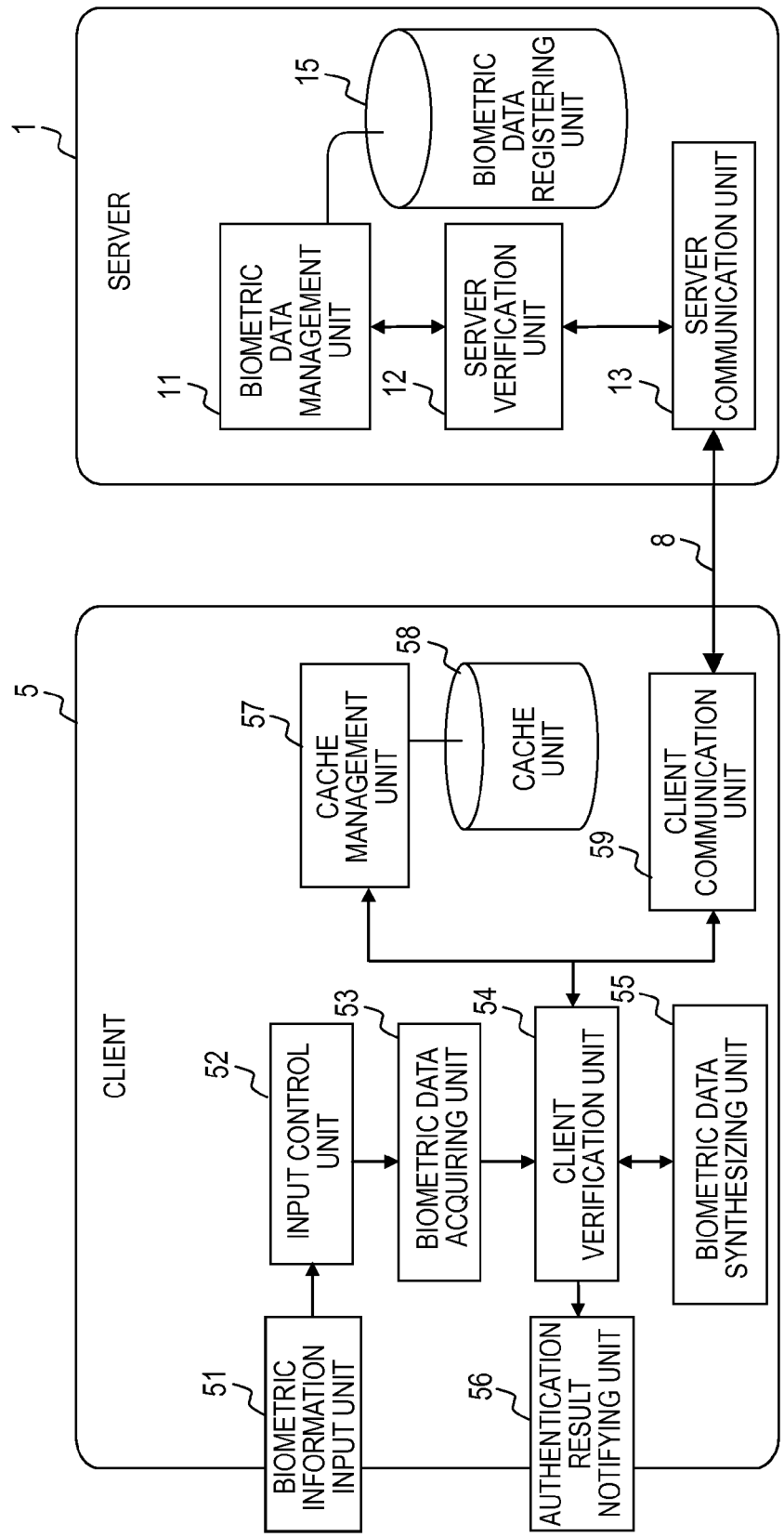
FIG. 1 is a block diagram illustrating an outline of an architecture of a biometric authentication system in a first embodiment.

FIG. 1 is a block diagram illustrating an outline of an architecture of the biometric authentication system in a first embodiment. The biometric authentication system in the first embodiment includes a client device (which will hereinafter be simply referred to as a client) 5 and a biometric authentication server device (which will hereinafter be simply referred to as a server) 1. The server 1 and the client 5 are connected to each other via a network 8. The embodiment does not limit a form of the network 8, and therefore the network 8 may be the Internet and may also be an in-office LAN (Local Area Network. Further, FIG. 1 depicts one client 5 and one server 1 for the explanatory convenience, however, the biometric authentication system in the embodiment may be configured to include a plurality of clients 5 and a plurality of servers 1.

[Configuration of Device]

Outlines of configurations of the server 1 and the client 5 will hereinafter be described, respectively.

The client 5 includes a biometric information input unit 51, an input control unit 52, a biometric data acquiring unit 53, a client verification unit 54, a biometric data synthesizing unit 55, a cache management unit 57, a cache unit 58, a client communication unit 59, etc. These respective processing units of the client 5 are realized by way of software components or hardware components or combinations thereof (refer to Paragraph [Others]).

The biometric information input unit 51 reads biometric information from a user and outputs the readout biometric information. The biometric information input unit 51, which is realized as, e.g., a sensor, reads the biometric information by: irradiating the light toward a living body and detecting the light reflected therefrom; disposing a multiplicity of electrodes and detecting a difference between electrostatic capacities that differ based on dielectric of the living body; inputting an uttered voice to a microphone and detecting a voiceprint; and writing user's signature on a tablet and detecting time-series information of handwriting, a strength of brushstroke and an inclination of the pen. The biometric information involves utilizing a fingerprint, an iris, a retina, an image of blood vessel, a voiceprint, a signature, etc. The present embodiment will, though not limited to a type of the biometric information, be described by exemplifying the fingerprint in the following discussion as the case may be.

The input control unit 52 controls the biometric information input unit 51. The input control unit 52 obtains the biometric information read by the biometric information input unit 51 and sends this biometric information to the biometric data acquiring unit 53.

The biometric data acquiring unit 53 obtains the biometric information from the input control unit 52, and acquires biometric data from this biometric information. The biometric data acquired herein is feature information of the living body and contains, e.g., information of coordinates, information of feature points, etc. Note that the present embodiment does not limit a biometric data acquiring technique by the biometric data acquiring unit 53 but may use known techniques, and hence their descriptions are omitted herein. The biometric data acquired by the biometric data acquiring unit 53 will hereinafter be referred to as temporary biometric data. The temporary biometric data is sent to the client verification unit 54.

The cache unit 58 retains the temporary biometric data and a user ID for identifying a user with respect to each individual user whose validity is authenticated by the server 1 via the client 5. Each user desiring to be authenticated by the present biometric authentication system previously registers the user ID and the biometric data of the user in the server 1. The biometric data registered in the server 1 will hereinafter be termed reference biometric data.

The cache management unit 57 retains, in the cache unit 58, the temporary biometric data acquired by the biometric data acquiring unit 53 and authenticated in its validity in the server 1 in the way of being associated with the user ID of the user that is transmitted from the server 1. The cache management unit 57, in response to a request given from the client verification unit 54, extracts the retained biometric data and the retained user ID from the cache unit 58, and sends these items of data to the client verification unit 54. The biometric data retained in the cache unit 58 and the biometric data extracted from the cache unit 58 will hereinafter be referred to as cache biometric data.

The client communication unit 59 operates as an interface for performing communications with other devices such as the server 1 via the network 8. Specifically, the client communication unit 59 includes, for instance, a NI (Network Interface) device, a driver for controlling this NI device, a protocol stack, a communication function process utilizing this protocol stack, etc. The client communication unit 59, upon receiving a communication request from another component device within the client 5, transmits the predetermined data to another specified device. The client communication unit 59, when receiving the predetermined data from another device via the network 8, transmits the received data to another component device within the client 5.

The client verification unit 54, upon receiving the temporary biometric data from the biometric data acquiring unit 53, verifies the temporary biometric data with the cache biometric data retained in the cache unit 58, thereby identifying the authentication target user. The cache unit 58 retains the user IDs and the biometric data about a plurality of users as the case may be, and therefore the client verification unit 54 verifies the data on a one-to-many authentication basis. To be specific, the client verification unit 54 requests the cache management unit 57 to extract the cache biometric data and the user IDs and executes the following verification process with respect to each item of cache biometric data extracted from the cache unit 58.

The client verification unit 54 sends the temporary biometric data and the cache biometric data to the biometric data synthesizing unit 55, and acquires a match rate and match feature point information from the biometric data synthesizing unit 55. The match rate and the match feature point information will be described later on. The client verification unit 54, if the acquired match rate is equal to or larger than a predetermined threshold value, determines that the verification of the temporary biometric data with the cache biometric data gets successful. Through this process, the client verification unit 54 specifies the cache biometric data with the success in this verification to be the biometric data which reflects the past biometric information of the authentication target user. The predetermined threshold value about the match rate is retained beforehand adjustably in a memory etc and is set to, e.g., 0.75.

The client verification unit 54, when determining the verification to get successful, requests the client communication unit 59 to transmit the authentication request containing the match feature point information and user ID of the biometric data to the server 1. The client verification unit 54, when acquiring a response to the authentication request from the server 1 via the client communication unit 59, sends a content of this response to the authentication result notifying unit 56. The content of the response contains information indicating the success in the authentication or a failure of the authentication.

The biometric data synthesizing unit 55, upon acquiring the temporary biometric data and the cache biometric data from the client verification unit 54, extracts the feature point matched with the feature point contained in the cache biometric data from within the feature points contained in the temporary biometric data. Herein, the match of the feature point implies that a difference between the feature point of the cache biometric data and the feature point of the temporary biometric data is less than the predetermined threshold value, and embraces not only a case of complete match but also a case of being approximate in the range of the predetermined threshold value. The feature point determined to be matched by the biometric data synthesizing unit 55 is referred to as a match feature point. This match feature point is synthetized information of the information further reflecting the present biometric information in the cache biometric data in which the past biometric information is reflected, i.e., the biometric data (the cache biometric data) authenticated in the past and the biometric data (the temporary biometric data) that is read at the present.

The biometric data synthesizing unit 55 determines, based on the extracted match feature point, such as a polygon (which is also called a convex hull) as to embrace all the match feature points and to minimize an area as a feature point area. The biometric data synthesizing unit 55 calculates a rate of the match feature point to all the feature points within this feature point area. This calculated value is expressed as the match rate. Herein, one of the reasons why the feature point is set as the convex hull is that a calculation algorithm can be simplified, and hence a processing speed can be improved. The biometric data synthesizing unit 55 sends the match feature point information and the match rate back to the client verification unit 54.

Figure 2:
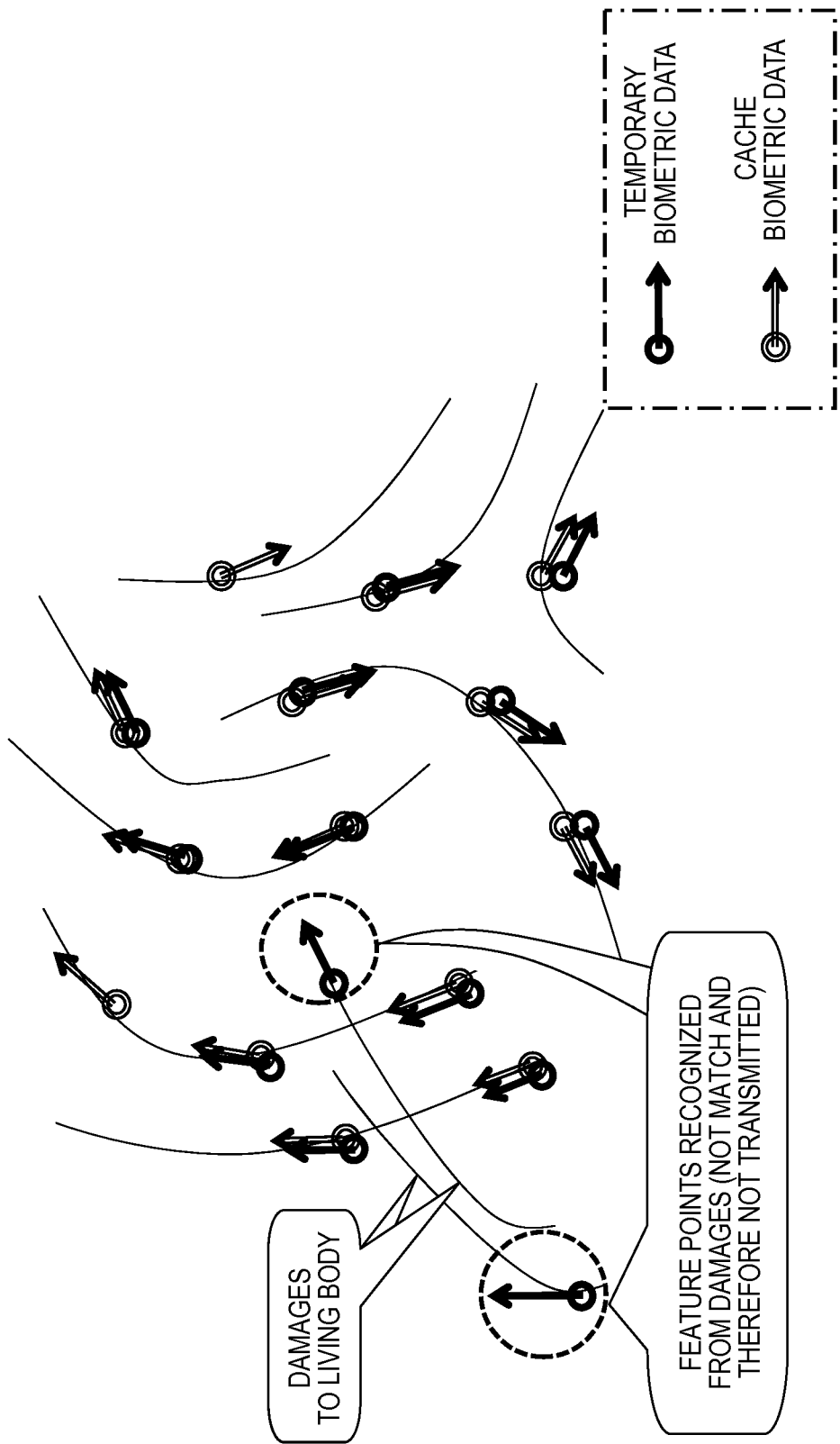
FIG. 2 is a diagram illustrating an example of match feature point information.
Figure 3:
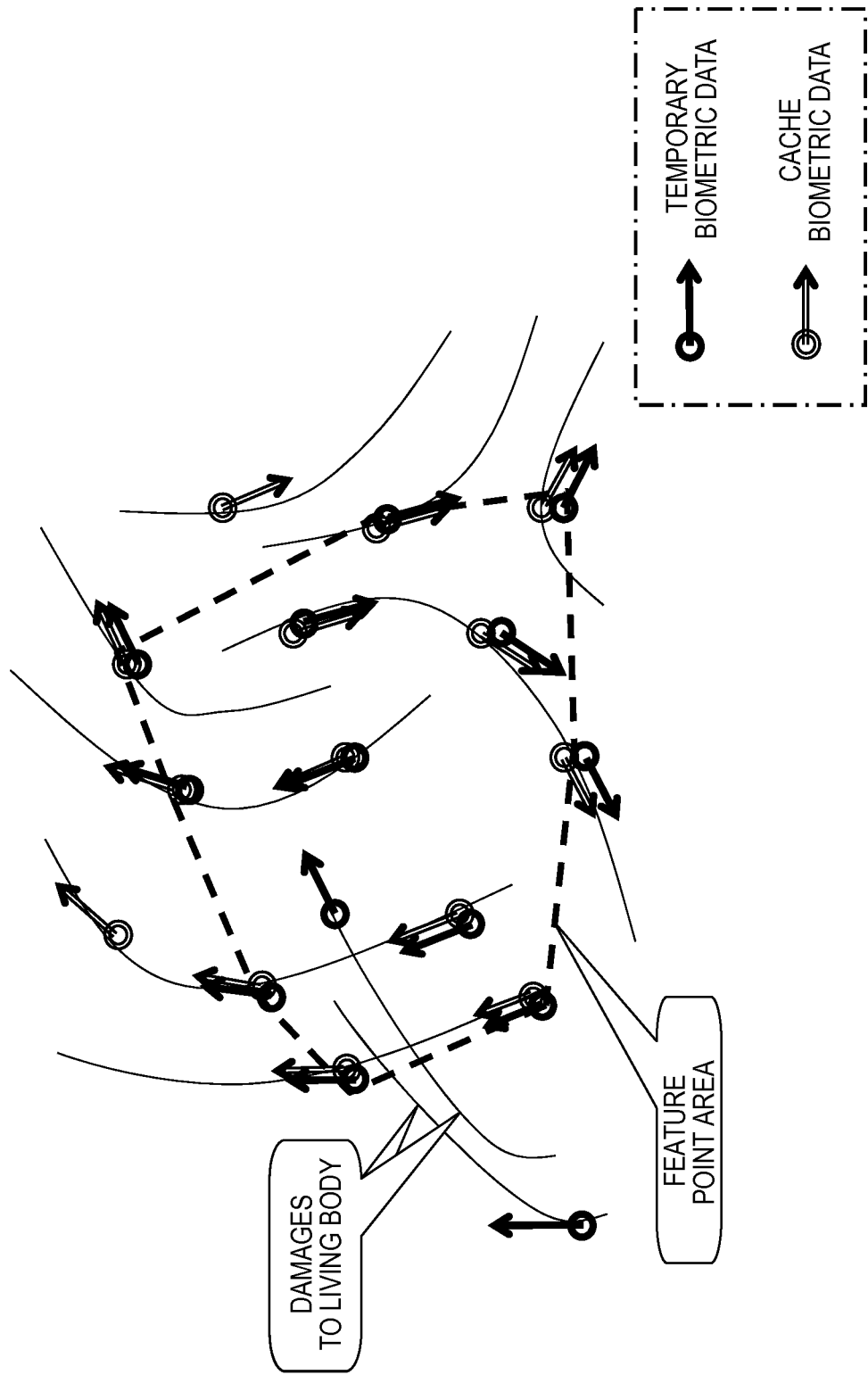
FIG. 3 is a diagram illustrating an example of a feature point area.

FIG. 2 is a diagram depicting an example of the match feature point information, and FIG. 3 is a diagram illustrating an example of the feature point area. As depicted in FIG. 2, the biometric data synthesizing unit 55 extracts, as the match feature points, the completely matched feature point and the feature point that gets approximate in the range of the predetermined threshold value within the respective feature points of the temporary biometric data and the cache biometric data. As a result, the client verification unit 54 transmits the information on the match feature points to the server 1, and therefore a non-match feature point such as a feature point recognized due to a fresh wound scared on the living body is not transmitted to the server 1.

Furthermore, the biometric data synthesizing unit 55, as depicted in FIG. 3, determines the feature point area. According to the example of FIG. 3, the match feature points within the feature point area reach the number (12) of all the match feature point information, while there is none of the non-match feature points within the feature point area in the respective feature points of the cache biometric data, and therefore the match rate is calculated at $12/12$ (twelve-twelfth).

The authentication result notifying unit 56, when acquiring from the client verification unit 54 the content of the authentication response from the server 1, outputs this response content for the user. This output is actualized by displaying the content on a display connected to the client 5, a flash of LED (Light Emitting Diode) and so on.

The server 1 includes a biometric data management unit 11, a server verification unit 12, a server communication unit 13, a biometric data registering unit 15, etc. These processing units of the server 1 are respectively realized as software components or hardware components or combinations thereof (refer to Paragraph [Others]).

The biometric data registering unit 15 gets stored with an entry containing the user ID for identifying the user and the biometric data (reference biometric data) of the user with respect to each authentication target user in the present biometric authentication system. When a new user is set as the authentication target user in the biometric authentication system, the user ID and the biometric data of this new user are stored in the biometric data registering unit 15 via a user interface connected to the server 1 and via another device (both are not illustrated).

The biometric data management unit 11, in response to an extraction request given from the server verification unit 12, extracts the user ID and the reference biometric data out of the biometric data registering unit 15. The biometric data management unit 11, if the user ID is specified in the extraction request, extracts the reference biometric data of the user specified by the user ID.

The server communication unit 13 operates as an interface for performing the communications with other devices such as the client 5 via the network 8. To be specific, the server communication unit 13 includes, for example, the NI device, the driver for controlling this NI device, the protocol stack, the communication function process utilizing this protocol stack, etc. The server communication unit 13, upon receiving the communication request from another component device within the server 1, transmits the predetermined data to another specified device. The server communication unit 13, when receiving the predetermined data from another device via the network 8, transmits the received data to another component device within the server 1.

The server verification unit 12 conducts, based on the data transmitted to the client 5 via the server communication unit 13, one-to-one biometric authentication by use of the reference biometric data and the temporary biometric data that are stored in the biometric data registering unit 15.

As described above, when succeeding in verifying the temporary biometric data with the cache biometric data in the client 5, the server verification unit 12 receives the authentication request containing the match feature point information related to the temporary biometric data and the user ID via the server communication unit 13. The server verification unit 12, when receiving the authentication request, requests the biometric data management unit 11 to extract the reference biometric data specified by the user ID contained therein. The server verification unit 12, upon receiving the reference biometric data, verifies the feature point contained in this reference biometric data with the match feature point received from the client 5 (one-to-one biometric authentication).

The server verification unit 12 determines that the verification gets successful if the number of the feature points matched with the match feature points sent from the client 5 in the feature points contained in the reference biometric data becomes equal to or larger than the predetermined threshold value. The match between the feature points given herein is of the same concept as in the case of the client 5 described above. The server verification unit 12 sends the authentication response containing a result of the verification back to the client 5 via the server communication unit 13.

Note that the server verification unit 12 acquires the user ID and the temporary biometric data of the user in a status (a status immediately after the registration) where the cache biometric data does not exist in the client 5. In this case, the server verification unit 12 verifies the feature points contained in the temporary biometric data with the feature points contained in the reference biometric data.

[Operational Example]

Figure 4:
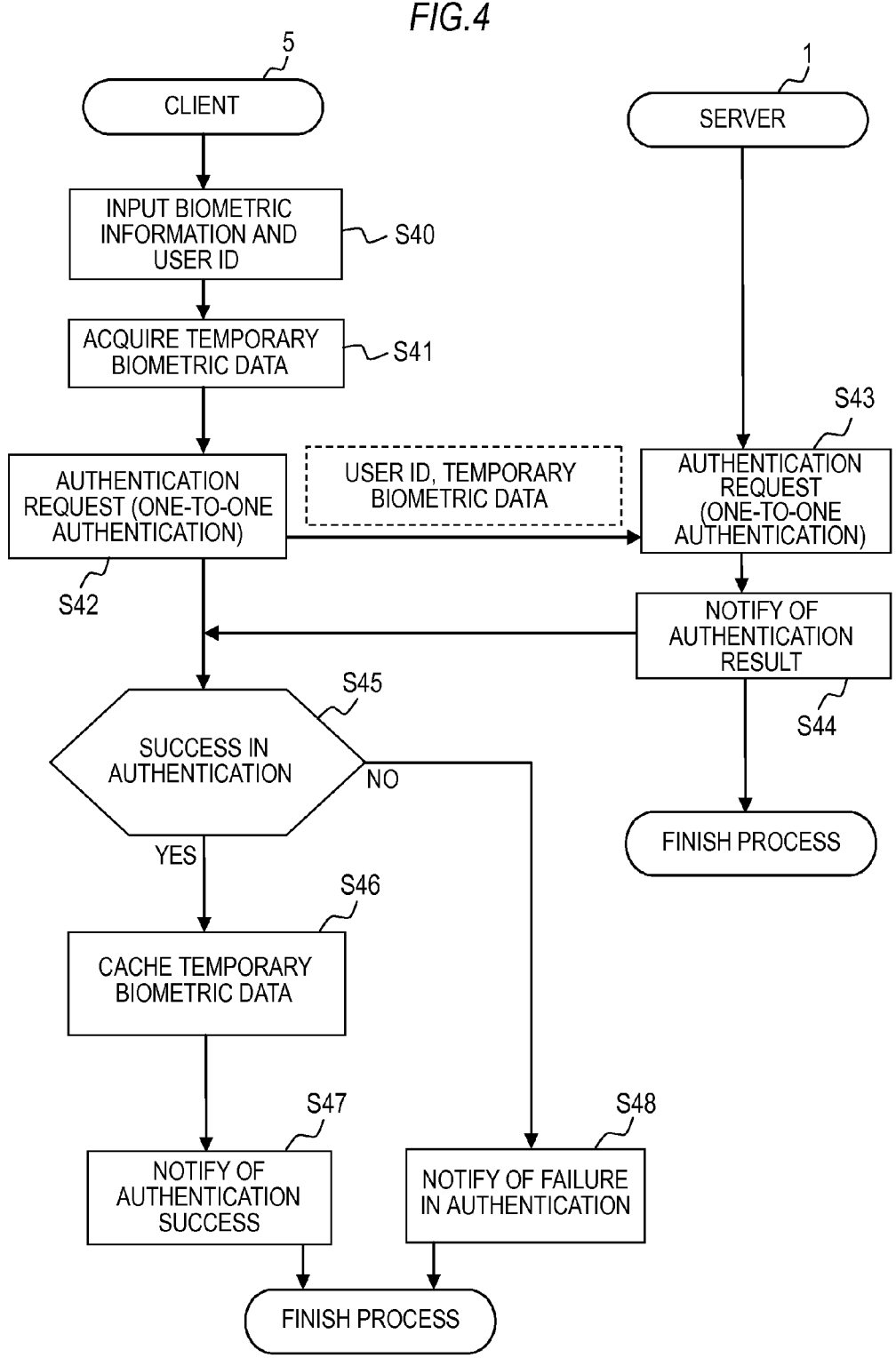
FIG. 4 is a flowchart illustrating pre-processing of the biometric authentication system in the first embodiment.
Figure 5:
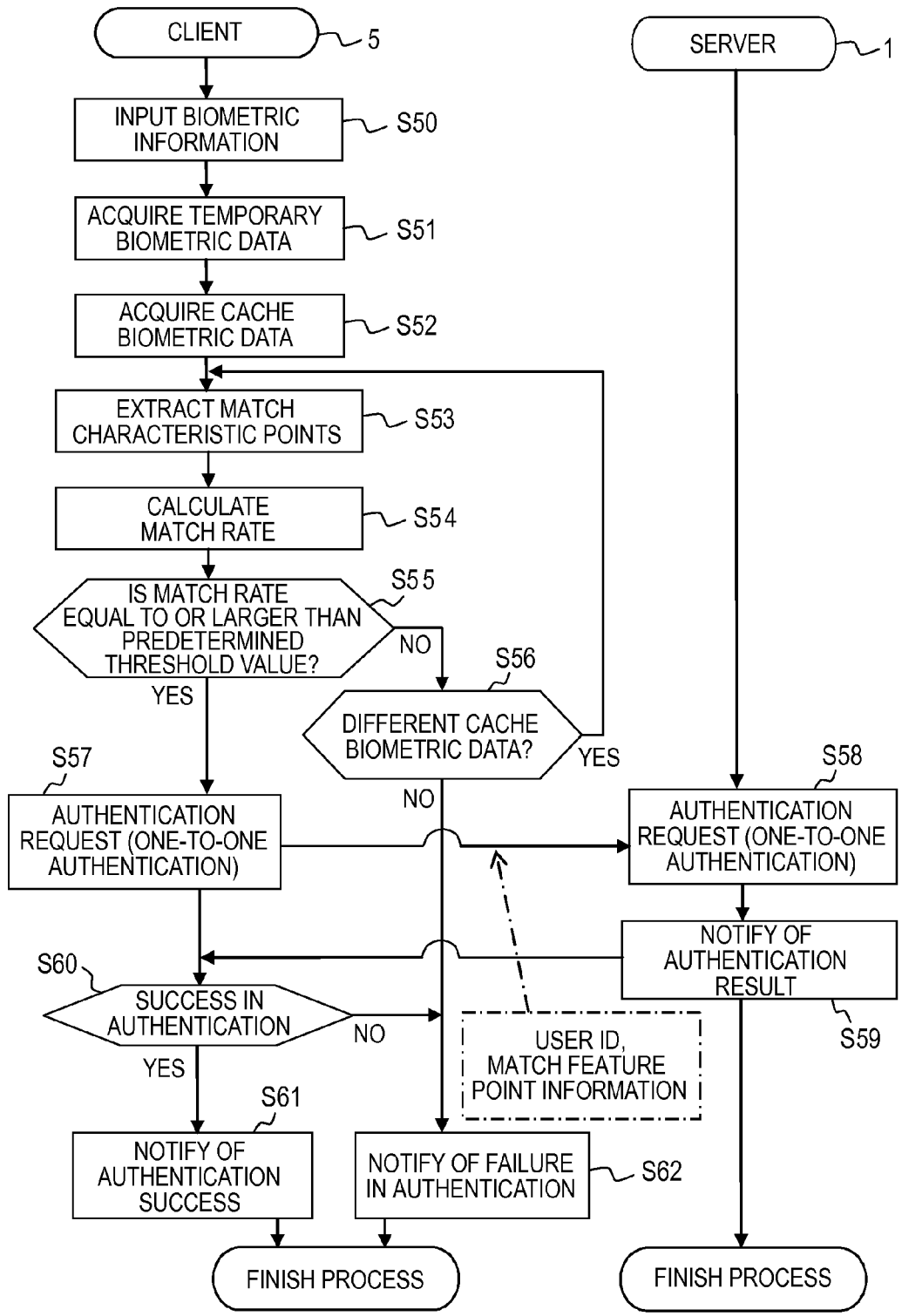
FIG. 5 is a flowchart illustrating an operational example of the biometric authentication system in the first embodiment.

An operational example of the biometric authentication system in the first embodiment will hereinafter be described by use of FIGS. 4 and 5. FIG. 4 is a flowchart illustrating a preprocessing of the biometric authentication system in the first embodiment. FIG. 5 is a flowchart illustrating an operational example of the biometric authentication system in the first embodiment.

The user IDs of the individual users each becoming the authentication target user and the biometric data of the users, are previously stored in the biometric data registering unit 15 of the server 1. The user, when finishing registering the user ID of the biometric data of the user himself or herself in the server 1, performs authentication confirmation in the biometric authentication system by employing the client 5. This authentication confirmation represents the preprocessing depicted in FIG. 4. This authentication confirmation may be executed through an operation of selecting an authentication confirmation mode on the client 5 and may also be executed by specifying, when the user the authentication for the first time on the client 5, this purport to the client 5.

When making the authentication confirmation, in the client 5, the biometric information input unit 51 reads the biometric information from the user, and another input unit (not illustrated) receives an input of the user ID of this user (S40). The readout biometric information and the inputted user ID are sent to the biometric data acquiring unit 53 via the input control unit 52.

The biometric data acquiring unit 53 acquires the temporary biometric data containing the coordinate information, the feature point information, etc from the readout biometric information (S41). When the acquired temporary biometric data and the user ID are sent to the client verification unit 54, the client verification unit 54 transmits the authentication request containing the temporary biometric data and the user ID to the server 1 via the client communication unit 59 (S42).

In the server 1, the server verification unit 12 receives the authentication request through the server communication unit 13. The server verification unit 12 requests the biometric data management unit 11 to extract the reference biometric data associated with the user ID contained in the authentication request. The server verification unit 12, upon acquiring the reference biometric data associated with the user ID from the biometric data management unit 11, verifies the reference biometric data with the temporary biometric data sent from the client 5 (S43). Note that this verification process may be a known process, and hence the description thereof is omitted herein. The server verification unit 12 sends a result of this verification as a result of the authentication back to the client 5 via the server communication unit 13 (S44).

The client verification unit 54 of the client 5, upon receiving the authentication result from the server 1 via the client communication unit 59, makes a determination about this authentication result (S45). If this authentication result indicates a success (S45; YES), the client verification unit 54 transmits the temporary biometric data and the user ID of the authentication target user to the cache management unit 57. The cache management unit 57 caches the user ID and the temporary biometric data on the cache unit 58 (S46).

Finally, the client verification unit 54 sends the authentication result transmitted from the server 1 to the authentication result notifying unit 56, and outputs this result to the authentication target user (S47 or S48). The user, whose biometric data thus undergoes a completion of preprocessing and is cached in the client 5, is hereinafter enabled to conduct the normal authentication in the present biometric authentication system.

In the normal authentication, the user gets the client 5 to read only the biometric information without inputting the user ID (S50). The biometric information read by the biometric information input unit 51 of the client 5 is transmitted to the biometric data acquiring unit 53. The biometric data acquiring unit 53 acquires the temporary biometric data from the biometric information (S51). The thus acquired temporary biometric data is transmitted to the client verification unit 54.

The client verification unit 54, when receiving the temporary biometric data, requests the cache management unit 57 to extract the cache biometric data. At this time, the cache unit 58 is cached with the biometric data of the plurality of users as the case may be. In this case, the client verification unit 54 performs the one-to-many biometric authentication between the temporary biometric data and plural sets of cache biometric data.

The client verification unit 54, upon acquiring the cache biometric data (S52), sends the temporary biometric data and the cache biometric data to the biometric data synthesizing unit 55.

The biometric data synthesizing unit 55, when acquiring the temporary biometric data and the cache biometric data from the client verification unit 54, extracts the feature points matched with the feature points contained in the cache biometric data from within the feature points contained in the temporary biometric data (S53). The biometric data synthesizing unit 55 determines the feature point area on the basis of the extracted match feature points. The biometric data synthesizing unit 55 calculates a rate of the match feature points to all the feature points contained in the cache biometric data in this feature point area (S54). The biometric data synthesizing unit 55 transmits the calculated match rate and the match feature point information to the client verification unit 54.

The client verification unit 54, when receiving the match rate from the biometric data synthesizing unit 55, determines whether the match rate is equal to or larger than the predetermined threshold value or not (S55). The client verification unit 54, if the match rate is equal to or larger than the predetermined threshold value (S55; YES), determines that the verification of the temporary biometric data with the cache biometric data gets successful. The client verification unit 54, when determining that verification gets successful, transmits the authentication request containing the match feature point information and the user ID of the biometric data to the server 1 via the client communication unit 59 (S57).

Note that the client verification unit 54, if the match rate is less than the predetermined threshold value (S55; NO), the verifications existences of other sets of cache biometric data (S56). The client verification unit 54, if there are other sets of cache biometric data (S56; YES), executes again the respective processes in (S53), (S54) and (S55) by targeting the processing at one other set of cache biometric data. The client verification unit 54, if there is none of the cache biometric data of which the match rate becomes equal to or larger than the predetermined threshold value (S56; NO), instructs the authentication result notifying unit 56 to output a failure in the authentication (S62).

The client verification unit 54, if there is the cache biometric data of which the match rate becomes equal to or larger than the predetermined threshold value (S56; YES), transmits the authentication request containing the user ID of the cache biometric data and the match feature point information to the server 1 via the client communication unit 59 (S57).

In the first embodiment and second, third and fifth embodiments that will hereinafter be discussed, the authentication request is transmitted to the server 1 at the stage where the match rate becomes equal to or larger than the predetermined threshold value, however, the invention is not limited to this method. Namely, the match rates with respect to all the cache biometric data are calculated (S54), and the authentication request containing the match feature point information in which the biometric data is equal to or larger than the predetermined threshold value and gets maximized and the user ID of the biometric data, may be transmitted to the server 1 via the client communication unit 59 (S57).

In the server 1, the server verification unit 12 receives the authentication request through the server communication unit 13. The server verification unit 12 requests the biometric data management unit 11 to extract the reference biometric data associated with the user ID contained in the authentication request. The server verification unit 12, when acquiring the reference biometric data associated with the user ID, verifies the feature points contained in the reference biometric data with the match feature points sent from the client (S58). For example, in this verification, the server verification unit 12, if the number of matched points between the feature points contained in the reference biometric data and the match feature points sent from the client 5 becomes equal to or larger than the predetermined threshold value, determines that the verification gets successful. The server verification unit 12 sends the result of this verification as the authentication result back to the client 5 via the server communication unit 13 (S59).

The client verification unit 54 of the client 5, when receiving the authentication result from the server 1 via the client communication unit 59, makes the determination about the authentication result (S60). If this authentication result indicates the success (S60; YES), the client verification unit 54 instructs the authentication result notifying unit 56 to output an authentication success (S61). Whereas if the authentication result indicates a failure in authentication (S60; NO), the client verification unit 54 instructs the authentication result notifying unit 56 to output the authentication failure (S62).

<<Operation and Effect of First Embodiment>>

In the biometric authentication system of the first embodiment, the cache unit 58 of the client 5 is cached with the biometric data and the user ID for identifying the user with respect to each user whose validity is authenticated by the server 1 via the clients. The user with the validity being once authenticated by the server 1 via the client 5 is again authenticated through the client 5, in which case the one-to-many biometric authentication is implemented between the temporary biometric data read out when in the authentication and the cached biometric data. As a result of the one-to-many biometric authentication, the user is uniquely identified, and the user ID of this user and the user's cache biometric data are acquired.

According to the first embodiment such as this, even in the one-to-many biometric authentication with no input of the user ID, an authentication speed can be improved as compared with the authentication targeted at the biometric data of all the users because of being targeted at the biometric data cached on the client 5. Furthermore, as the one-to-many biometric authentication is conducted in the client 5, the authentication process on the server 1 can be distributed, and, by extension, a processing load on the server 1 can be reduced.

Further, according to the first embodiment, the reference biometric data registered in the server 1 is not transferred to the client 5 from the server 1, and hence a risk against leakage of the reference biometric data can be decreased.

In the first embodiment, when the user is uniquely identified in the client 5, the match feature point information defined as the synthesized information of the acquired cache biometric data and the temporary biometric data is transmitted together with the user ID to the server 1 and utilized for the biometric authentication in the server 1. The match feature point information as the synthesized information turns out to be such a piece of information that the present biometric information is reflected in the cache biometric data of which the past biometric information is reflective.

According to the first embodiment, the match feature point information such as this is sent to the server 1 from the client 5, and it is therefore feasible to perform the control such as transmitting neither the information not existing in the present biometric information nor the information existing only in the present biometric information to the server. The information not existing in the present biometric information is not transmitted, whereby an identical person rejection rate can be reduced by not transmitting the information existing only in the present biometric information while keeping a different person acceptance rate. The information not existing in the present biometric information and the information existing only in the present biometric information, contain information generated corresponding to biometric changes such as variations in condition of the living body, ageing, etc, and hence, according to the first embodiment, the authentication accuracy can be prevented from declining corresponding to the biometric changes.

Further, in the first embodiment, in the one-to-many biometric authentication on the client 5, the polygon embracing all the match feature points within the temporary biometric data and minimizing its area is determined as the feature point area, and the match rate in this feature point area is calculated. As a result, if the match rate becomes equal to or larger than the predetermined threshold value, it comes to the determination of succeeding in verifying the temporary biometric data with the cache biometric data.

A continuity of the area where the match feature points exist is thus determined, whereby the different person having the similar feature points by accident can be prevented from being mistakenly authenticated.

As explained above, according to the first embodiment, the load on the authentication process can be reduced while keeping such a high level of authentication accuracy as to decrement the identical person rejection rate without decreasing the different person acceptance rate.

[Second Embodiment]

Figure 6:
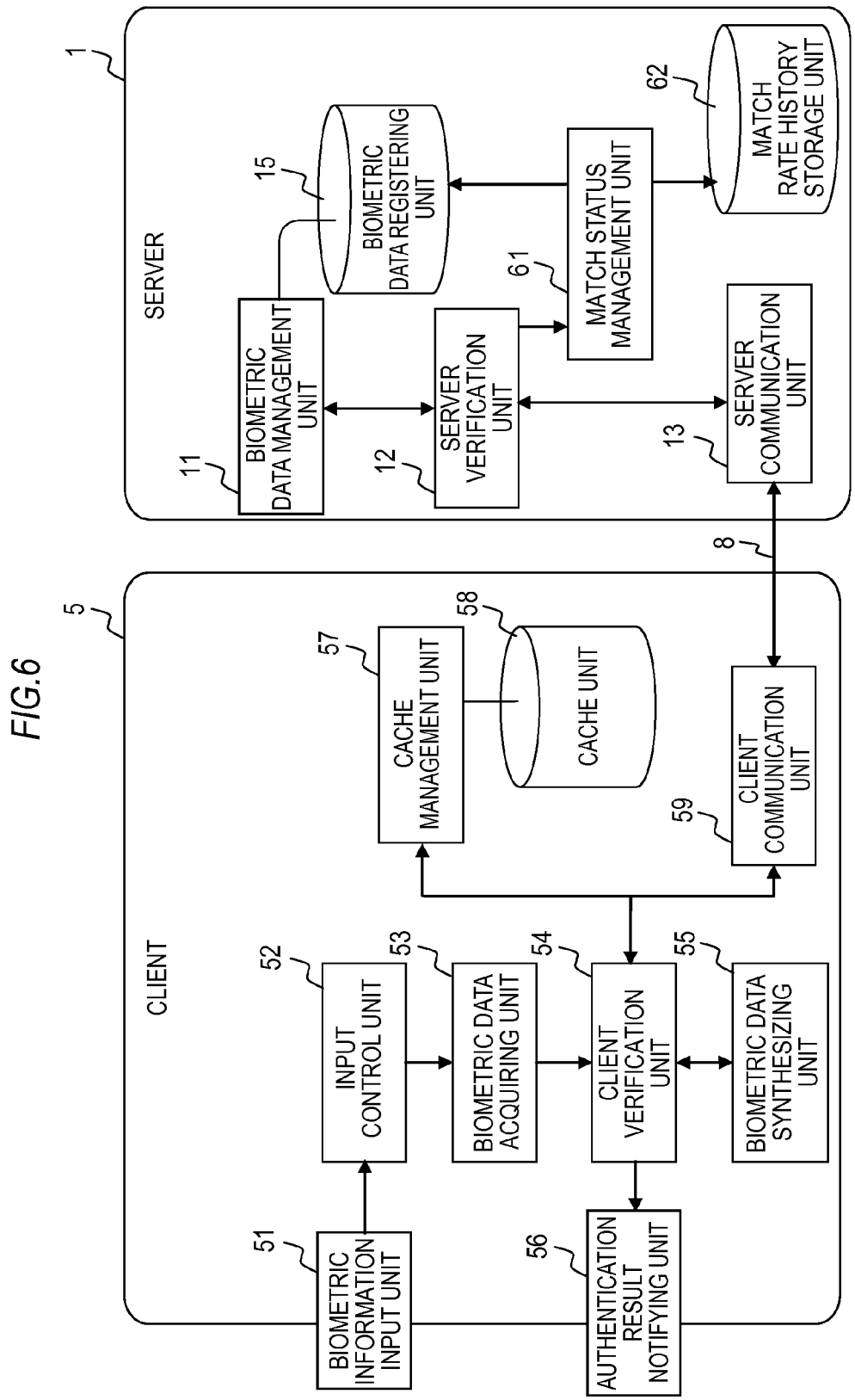
FIG. 6 is a block diagram illustrating an outline of an architecture of the biometric authentication system in a second embodiment.

FIG. 6 is a block diagram illustrating an outline of an architecture of the biometric authentication system in a second embodiment. In the biometric authentication system of the second embodiment, a process of updating the cache biometric data retained on the client 5 is added. The following discussion on the second embodiment will be focused on points different from the first embodiment, while the same contents as those of the first embodiment will be omitted.

[Device Configuration]

Outlines of configurations of the server 1 and the client 5 in the second embodiment will hereinafter be described. The server 1 in the second embodiment further includes, in addition to the components in the first embodiment, a match status management unit 61 and a match rate history storage unit 62. These processing units of the server 1 are respectively realized as software components or hardware components or combinations thereof (refer to Paragraph [Others]). The configuration of the client 5 in the second embodiment is the same as in the first embodiment. The respective processing units, which execute processes different from those in the first embodiment, will hereinafter be described.

In the client 5, the client verification unit 54, when transmitting the authentication request to the server 1, further sends the match rate calculated by the biometric data synthesizing unit 55 to the server 1 in addition to the match feature point information and the user ID. The client verification unit 54, upon receiving a response to the authentication request from the server 1, verifies a match rate decrease flag contained in this response in addition to transmitting the authentication result to the authentication result notifying unit 56 similarly to the first embodiment. The client verification unit 54, if the match rate decrease flag is set ON (indicating a decrease), transmits to the server 1 an evaluation request containing the temporary biometric data and the user ID in order to get the server 1 to evaluate the temporary biometric data that was previously the authentication request target data.

The client verification unit 54, when receiving an evaluation result in response to the evaluation request from the server 1, makes a determination about this evaluation result. This evaluation result contains, the match rate, i.e., a rate of the feature points matched between the temporary biometric data contained in the evaluation request and the reference biometric data registered in the server 1. The client verification unit 54, if this match rate is equal to or larger than the predetermined threshold value, requests the cache management unit 57 to update the cache biometric data of this user into the temporary biometric data.

The cache management unit 57, when receiving the update request from the client verification unit 54 as described above, overwrites the cache biometric data specified by the user ID of this user with the temporary biometric data.

In the server 1, the match rate decrease flag is stored together with the user ID and the reference biometric data in the biometric data registering unit 15. FIG. 7 is a diagram illustrating an example of the data stored in the biometric data registering unit 15. The match rate decrease flag is set ON if the match status management unit 61 determines based on a method as will be described later on that the match rate decreases but is set OFF in cases other than this instance. For example, "ON" is designated by the numeral "1", while "OFF" is designated by the numeral "0".

Further, the match rate history storage unit 62 is stored with the user ID and a history of the match rate that are contained in the authentication request given from the client 5 together with authentication date/time information. FIG. 8 is a diagram illustrating an example of the data stored on the match rate history storage unit 62. Herein, the authentication date/time information may represent a date/time when the server 1 receives the authentication request and may also represent a date/time when the server verification unit 12 conducts the one-to-one biometric authentication.

The match status management unit 61, upon receiving the authentication request from the client 5 via the server verification unit 12, stores the match rate and the user ID each contained in this authentication request in the match rate history storage unit 62.

The match status management unit 61 makes a determination about the match rate decrease status of each user on the basis of the match rate history stored in the match rate history storage unit 62 at a predetermined timing. The match status management unit 61, as a result of this determination, updates the match rate decrease flag of the biometric data registering unit 15. This predetermined timing may be a timing when another processing unit (not illustrated) determines the processing load on the server 1 to be small, may further be a predetermined cycle and may also be a timing when receiving the authentication request from the client 5.

To be specific, the match status management unit 61 sorts the data in the match rate history storage unit 62 with the user ID and the authentication date/time information, and acquires the latest match rate and a match rate variation quantity on a per-user-ID basis. The latest match rate is acquired from the entry registered latest. The match rate variation quantity is calculated as a value obtained by averaging, corresponding to the number of the match rate histories related to the user concerned, values given from dividing differences in match rate between the adjacent entries by time differences between the respective adjacent entries. The match status management unit 61, with respect to each user ID, if the latest match rate is less than the predetermined threshold value and if the match rate variation quantity is minus and equal to or smaller than the predetermined threshold value (minus value), determines the match rate decrease flag associated with the user ID to be set ON. The predetermined threshold value compared with the latest match rate and the predetermined threshold value compared with the match rate variation quantity are previously adjustably retained on the memory etc. The predetermined threshold value compared with the latest match rate is set to, e.g., 0.8. Further, the predetermined threshold value compared with the match rate variation quantity is set to, e.g., −0.033. The match status management unit 61 reflects the match rate decrease flag determined in the way described above in the match rate history storage unit 62.

The server verification unit 12, when receiving the evaluation request sent from the client 5 via the server communication unit 1, the temporary biometric data contained in the evaluation request by use of the reference biometric data specified by the user ID contained in the evaluation request. This evaluation involves making use of, e.g., the match rate. In this case, the server verification unit 12 extracts the match feature points between the temporary biometric data and the reference biometric data, then determines the feature point area corresponding to the match feature points, and calculates, as the match rate, a rate of the match feature points to all the feature points in the feature point area. The server verification unit 12 transmits the match rate as the evaluation result to the client 5 via the server communication unit 13.

[Operational Example]

Figure 9:
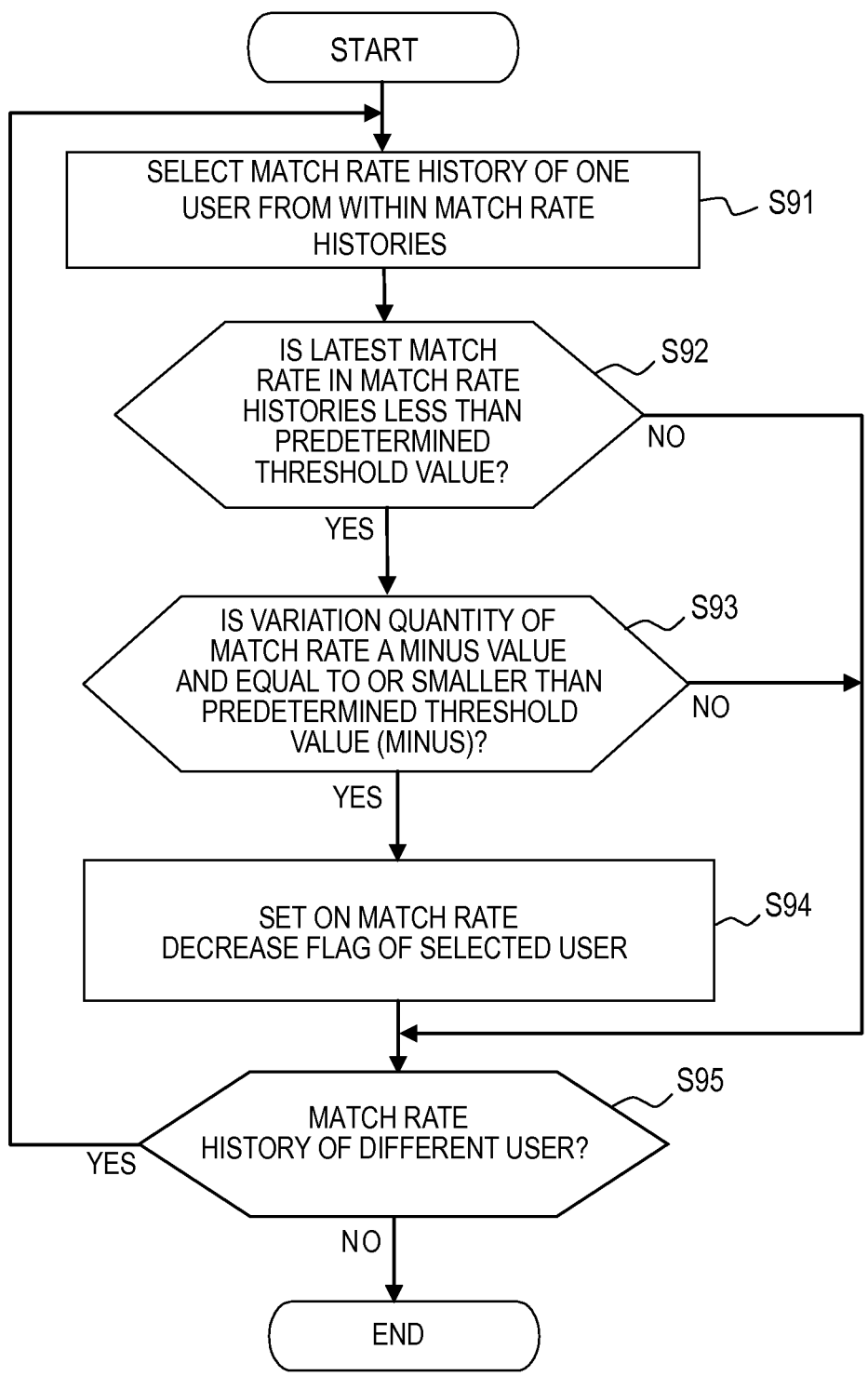
FIG. 9 is a flowchart illustrating a match rate decrease flag updating process of a server 1 in the second embodiment.

An operational example of the biometric authentication system in the second embodiment will hereinafter be described by use of FIGS. 9, 10A and 10B. FIG. 9 is a flowchart illustrating a match rate decrease flag update process of the server 1 in the second embodiment.

The match status management unit 61 of the server 1 executes the processes depicted in FIG. 9 at the predetermined timing described above. The match status management unit 61 selects the match rate history of any one of the users from within the match rate history storage unit 62 (S91). The match status management unit 61 extracts match rate with the latest authentication date/time being set in the selected match rate history, and compares the latest match rate with the predetermined threshold value (S92).

The match status management unit 61, if the latest match rate is less than the predetermined threshold value (S92; YES), calculates the match rate variation quantity of this user. The match status management unit 61 sorts the selected match rate history on the basis of the authentication date/time, and calculates each value in a way that divides the difference in match rate between the respective adjacent entries by the time difference in authentication date/time therebetween. The match status management unit 61 calculates an average value of the divided values as the match rate variation quantity of this user.

The match status management unit 61 determines whether or not the calculated match rate variation quantity of the user takes a minus value and is equal to or smaller than the predetermined threshold value (minus value) (S93). In other words, the match status management unit 61 determines whether the match rate decrease quantity is larger than the predetermined quantity or not. The match status management unit 61, if the match rate variation quantity takes the minus value and is equal to or smaller than the predetermined threshold value (S93; YES), sets ON the match rate decrease flag of the user in the biometric data registering unit 15 (S94). Note that if the latest match rate is not less than the predetermined threshold value (S92; NO) or if the match rate variation quantity does not take the minus value but is larger than the predetermined threshold value (minus value) (S93; NO), the match status management unit 61 makes the match rate decrease flag remain OFF.

Subsequently, the match status management unit 61 determines whether or not the match rate histories of other users are stored in the match rate history storage unit 62 (S95). The match status management unit 61, if the match rate histories of other users are stored in the match rate history storage unit 62 (S95; YES), restarts from the process in S91 for other users. The match status management unit 61, upon a completion of processing the match rate histories for all the users that are stored in the match rate history storage unit 62 (S95; NO), finishes the processing.

Figure 10A:
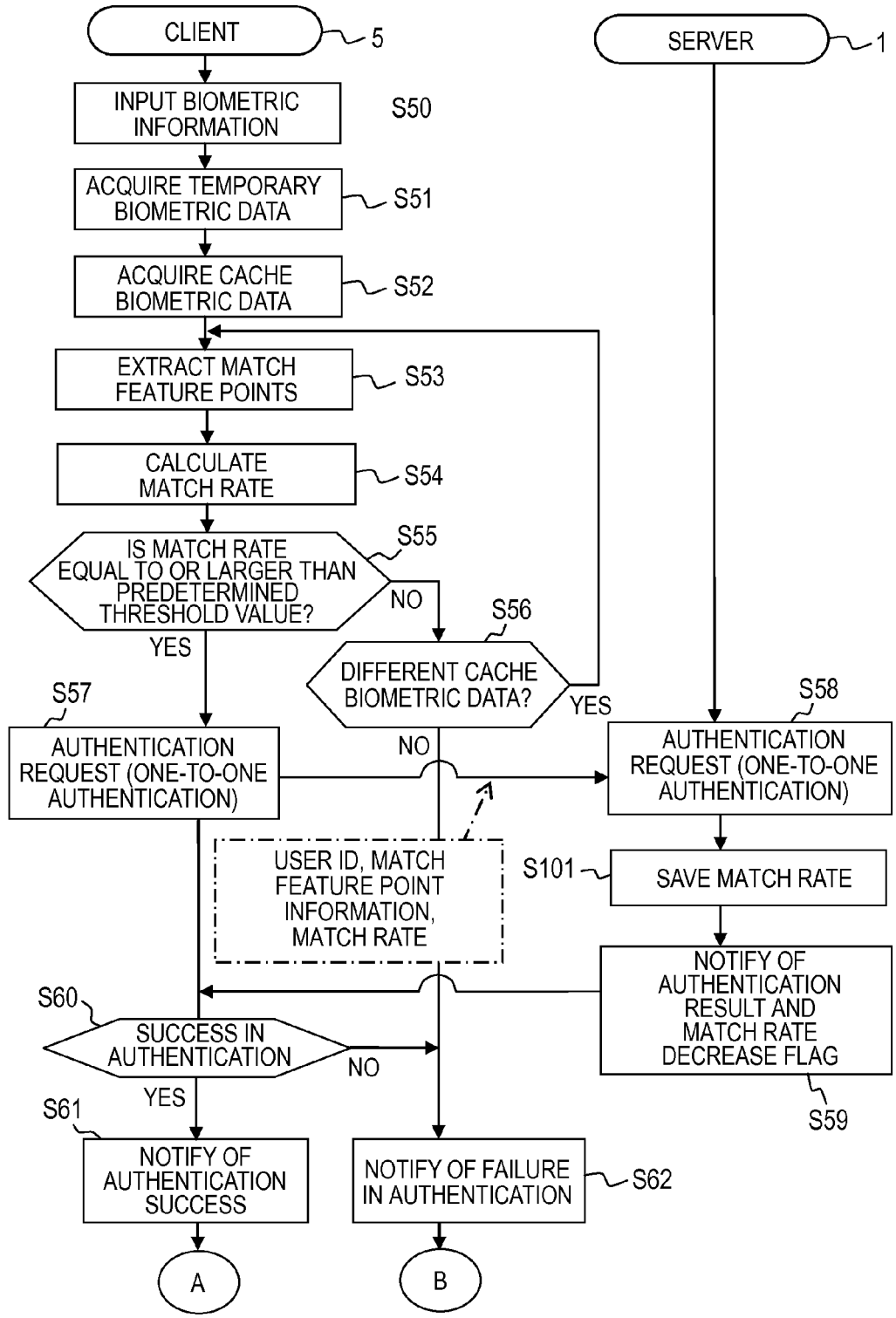
FIG. 10A is a flowchart illustrating an operational example of the biometric authentication system in the second embodiment.
Figure 10B:
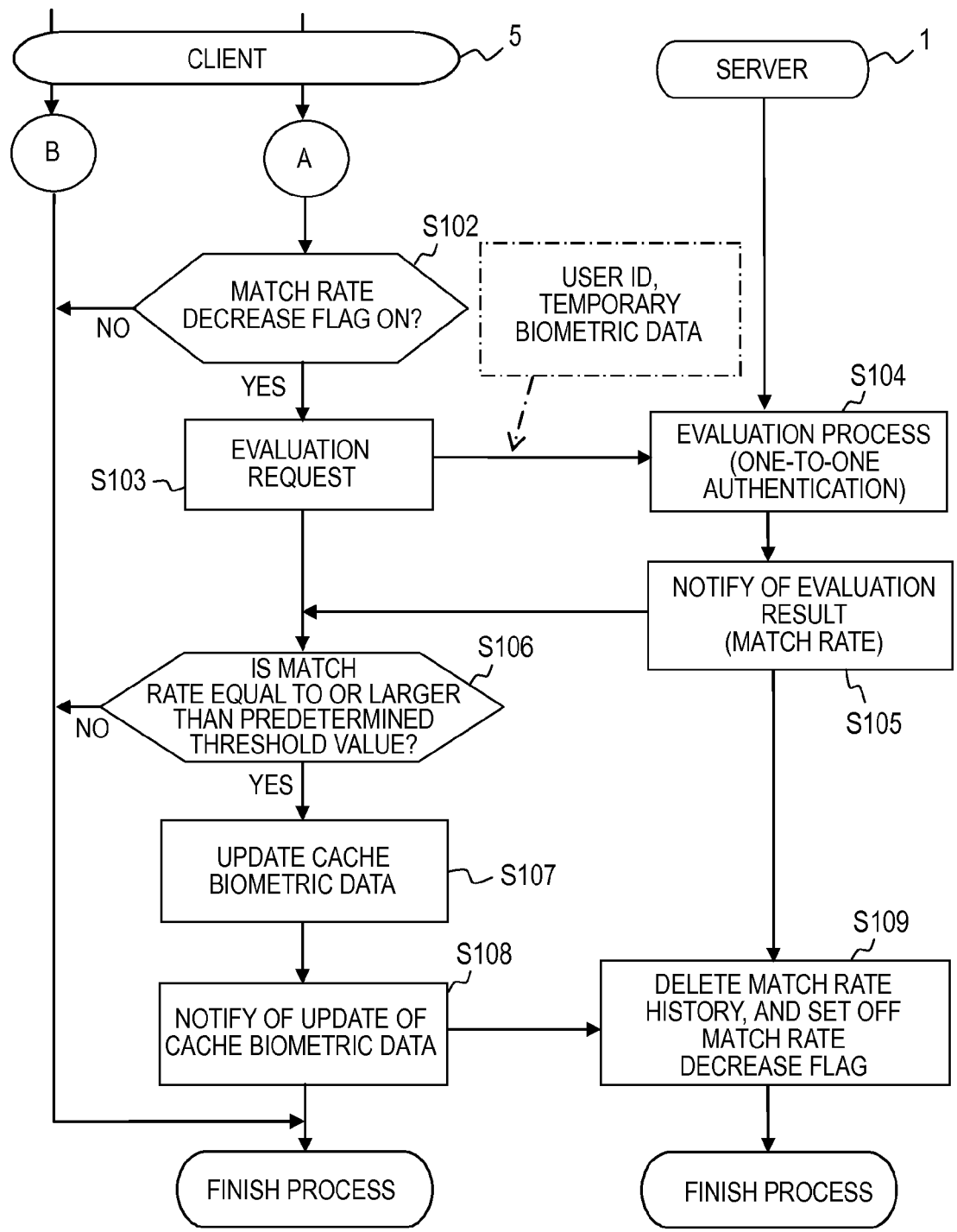
FIG. 10B is a flowchart illustrating the operational example of the biometric authentication system in the second embodiment.

FIGS. 10A and 10B are flowcharts illustrating an operational example of the biometric authentication system in the second embodiment. The operation is the same as the first embodiment till the server verification unit 12 of the server 1 verifies, in response to the authentication request sent from the client 5, the feature points contained in the reference biometric data with the match feature points sent from the client 5 (S58). The client verification unit 54 in the second embodiment, however, gets the authentication request to further contain the match rate calculated by the biometric data synthesizing unit 55. The match status management unit 61 receives the match rate, the user ID and the authentication date/time each contained in the authentication request and stores these items of information in the match rate history storage unit 62 (S101).

The server verification unit 12, when completing the verification (one-to-one biometric authentication) of the feature points contained in the reference biometric data with the match feature points sent from the client 5, transmits the match rate decrease flag extracted from the biometric data registering unit 15 back to the client 5 together with the authentication result (S59).

The client verification unit 54, upon receiving the authentication result, instructs the authentication result notifying unit 56 to output this authentication result similarly to the first embodiment (S61 or S62).

Subsequently, the client verification unit 54 makes the determination about the match rate decrease flag sent together with the authentication result (S102). The client verification unit 54, if the match rate decrease flag is set ON (S102; YES), transmits the evaluation request for the temporary biometric data to the server 1 (S103). The client verification unit 54 gets the evaluation request to contain the temporary biometric data and the user ID.

The server verification unit 12, when receiving this evaluation request, extracts the user ID and the reference biometric data each contained in the evaluation request from the biometric data registering unit 15, and verifies the reference biometric data with the temporary biometric data contained in the evaluation request (S104). The server verification unit 12 calculates, based on the feature points contained in the reference biometric data and the feature points contained in the temporary biometric data, the match rate as the evaluation result by the same technique as by the client verification unit 54 in the first embodiment (S104). The server verification unit 12 notifies the client 5 of this match rate as the evaluation result (S105).

The client verification unit 54, upon receiving the match rate sent as the evaluation result, determines whether or not this match rate becomes equal to or larger than the predetermined threshold value (S106). The client verification unit 54, if the match rate is equal to or larger than the predetermined threshold value (S106; YES), determines that the cache biometric data is to be updated, and sends this cache biometric data to the cache management unit 57. Note that the client verification unit 54, whereas if the match rate does not become equal to or larger than the predetermined threshold value (S106; NO), terminates the processing in an as-is status without updating the cache biometric data. It is to be noted that the match rate becomes equal to or larger than the predetermined threshold value, which implies that the evaluation result is satisfactory.

The cache management unit 57, when receiving the user ID and the temporary biometric data together with the update instruction from the client verification unit 54, updates the cache biometric data specified by the user ID in the cache unit 58 with the temporary biometric data (S107). The cache management unit 57, in the case of updating the cache biometric data, notifies the server 1 of this purport (S108). This notification contains the user ID of the user having the updated biometric data.

The match status management unit 61, when receiving the notification of the update of the cache biometric data from the client 5 via the server verification unit 12, deletes the match rate history associated with the user ID contained in this notification from the match rate history storage unit 62 (S109). Subsequently, the match status management unit 61 sets OFF the match rate decrease flag of the entry specified by the user ID contained in the notification in the biometric data registering unit 15 (S109).

<<Operation and Effect of Second Embodiment>>

In the biometric authentication system of the second embodiment, the server 1 retains, on the per-user basis, the history of the match rate between the temporary biometric data acquired when in the authentication and the cache biometric data of the user identified from the one-to-many biometric authentication on the client 5. In the server 1, the match rate decrease status for each user is determined based on the match rate history, and the match rate decrease flag being set ON is given to the reference biometric data of the user of which the latest match rate is less than the predetermined value and the match rate decrease quantity becomes equal to or larger than the predetermined quantity. This match rate decrease flag is sent together with the result of the one-to-one biometric authentication in the server 1 to the client 5.

If the result of the one-to-one biometric authentication in the server 1 indicates the success and if the match rate decrease flag of the user is set ON, the temporary biometric data at that time is transmitted to the server 1, and the temporary biometric data is evaluated in the server 1. The match rate, as the result of this evaluation, between the temporary biometric data and the reference biometric data is transmitted back to the client 5, and, if this match rate is equal to or larger than the predetermined threshold value, i.e., if the temporary biometric data is determined to be valid, the cache biometric data is updated with this temporary biometric data.

Thus, in the second embodiment, the validity of the cache biometric data in which the past biometric information of the user is reflected, is determined corresponding to the history of the match rate with respect to the temporary biometric data in which the latest biometric information of the user is reflected. As a result, if the match rate decrease quantity is over the predetermined quantity, i.e., if a difference between the past biometric information and the present biometric information is over the predetermined quantity, the necessity for updating the cache biometric data is recognized.

According to the second embodiment, a quality (validity) of the biometric data cached in the client 5 is thus recognized at the predetermined timing, and hence the quality of the cache biometric data can be maintained at the high level while following the variations etc of the biometric information. It is thereby possible to prevent a rise in identical person rejection rate, with which the variations in biometric information are concomitant.

Furthermore, in the second embodiment, the temporary biometric data for updating is evaluated in relation to the reference biometric data registered in the server 1. Only when the match rate as the evaluation result is equal to or larger than the predetermined threshold value, the cache biometric data is updated. With this contrivance, according to the second embodiment, after evaluating the status of the temporary biometric data for updating, the cache biometric data is updated, and therefore the quality of the cache biometric data can be maintained at the high level.

Moreover, in the second embodiment, the match rate is employed for keeping high the quality of the cache biometric data as described above. This leads to the confirmation of the continuity of the area with the match of the feature point information, and hence the different person acceptance rate can be maintained.

[Third Embodiment]

The biometric authentication system in a third embodiment will hereinafter be described. The client 5 is capable of caching the plural sets of biometric data about the individual users, respectively.

[Device Configuration]

The respective configurations of the server 1 and the client 5 in the third embodiment are the same as those in the first embodiment. The following discussion on the third embodiment will be focused on points different from the first embodiment, while the same contents as those of the first embodiment will be omitted.

FIG. 11 is a diagram illustrating an example of the data cached in the cache unit 58 in the third embodiment. As depicted in FIG. 11, the cache unit 58 of the client 5 is capable of caching plural sets of cache biometric data about the individual users. Further, the cache unit 58 gets stored with the match rate with respect to each set of cache biometric data. Note that a capacity of the cache unit 58 is finite, and therefore a predetermined upper limit number is set on the per-user basis in a data count of the cache biometric data that can be cached in the cache unit 58. This predetermined cache upper limit number is retained beforehand adjustably in the memory etc.

The cache management unit 57 performs control for enabling the plural sets of cache biometric data about the individual users to be cached in the cache unit 58. The cache management unit 57 controls the cache biometric data count with respect to each individual user corresponding to the cache upper limit number. The cache management unit 57, if the cache biometric data count of the target user reaches the cache upper limit number, deletes the cache biometric data exhibiting the low match rate on the basis of the match rate stored on the cache unit 58, and thereafter caches the temporary biometric data at that time in the cache unit 58.

Moreover, the cache management unit 57 manages, to be used for determining whether the temporary biometric data is added to the cache unit 58 or not, a date/time when storing the latest cache biometric data about each individual user on the cache unit 58. The cache management unit 57, when receiving a request for the shortest storage period with respect to a certain user from the client verification unit 54, calculates a period till the request reception time since the storage date/time managed for this user. The cache management unit 57 notifies the client verification unit 54 of this calculated period as the shortest storage period for this user. If the shortest storage period becomes equal to or longer than a predetermined period, a process for adding the temporary biometric data given when in the authentication to the cache unit 58 is thereby executed. The predetermined period compared with the shortest storage period is set to, e.g., 60 days and is adjustably retained beforehand in the memory.

The client verification unit 54, even when the plural sets of cache biometric data about the individual users are cached in the cache unit 58 as described above, performs the one-to-many biometric authentication targeted at all the cache biometric data within the cache unit 58, thus identifying the users. With this contrivance, for instance, even when the plural sets of cache biometric data about only one user are cached in the client 5 and the temporary biometric data of this user is acquired, the temporary biometric data is verified with the plural sets of cache biometric data.

[Operational Example]

Figure 12A:
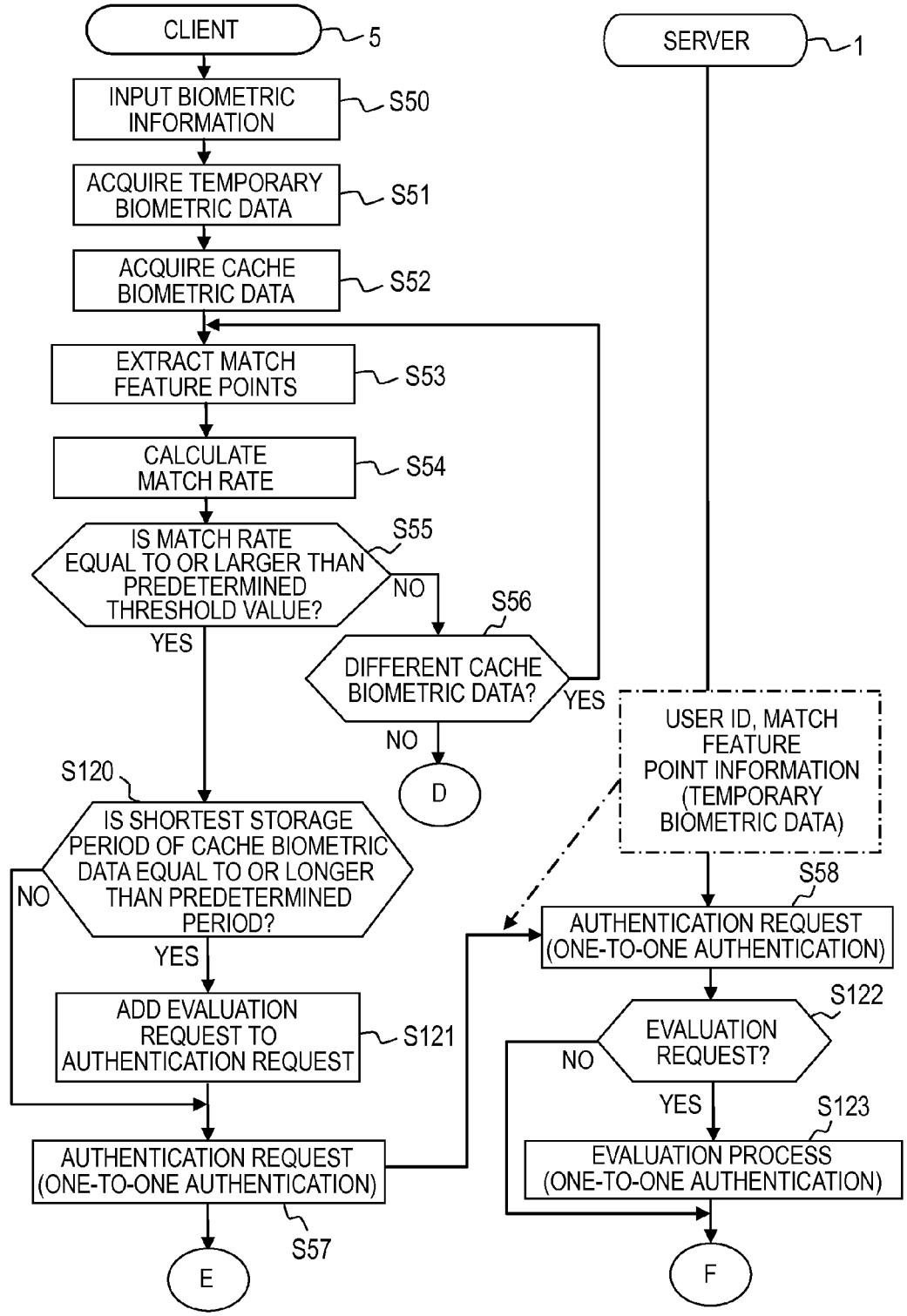
FIG. 12A is a flowchart illustrating an operational example of the biometric authentication system in the third embodiment.
Figure 12B:
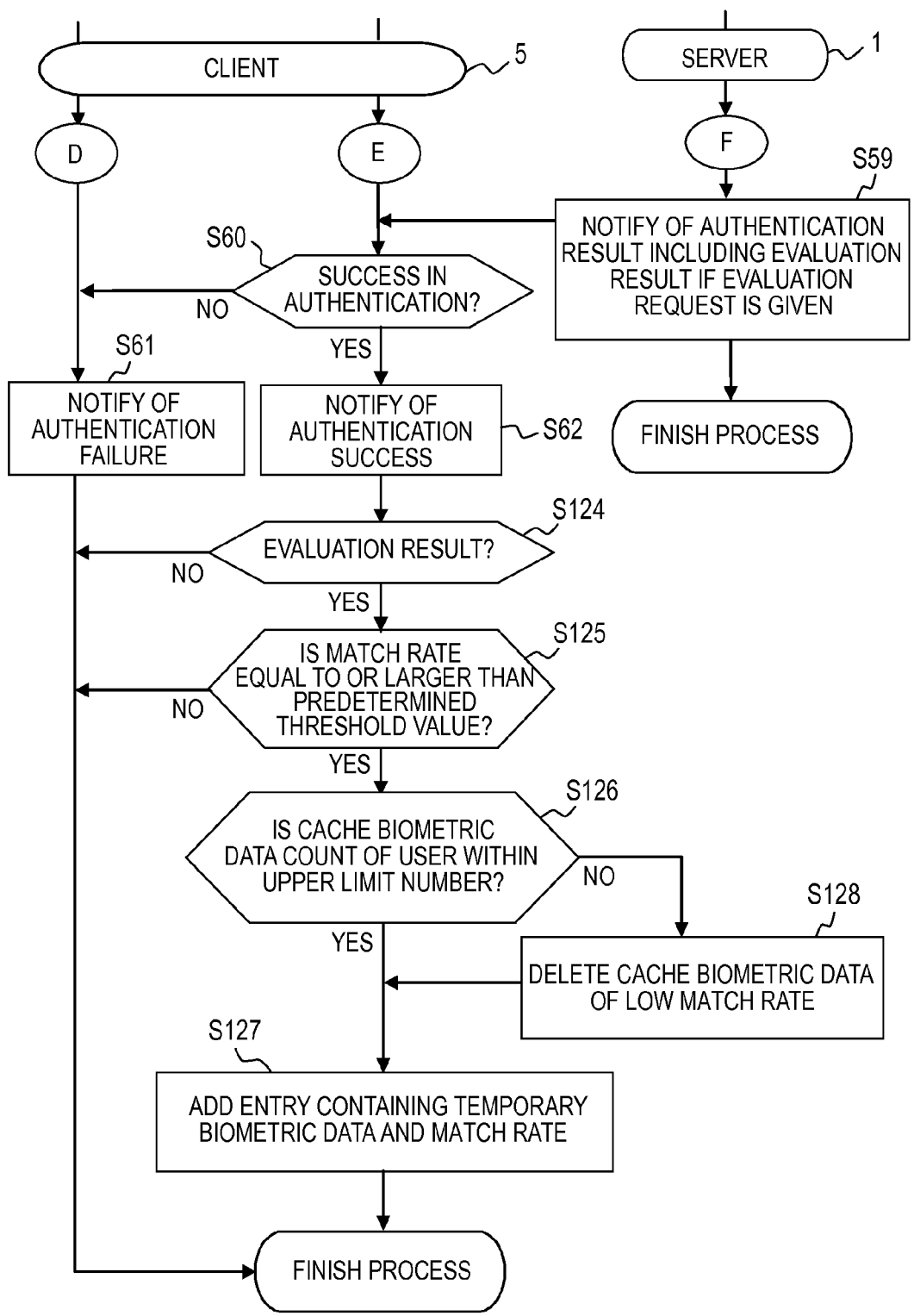
FIG. 12B is a flowchart illustrating the operational example of the biometric authentication system in the third embodiment.

An operational example of the biometric authentication system in the third embodiment will hereinafter be described by use of FIGS. 12A and 12B. FIGS. 12A and 12B are flowcharts illustrating the operational example of the biometric authentication system in the third embodiment.

The processes till the client verification unit 54 of the client 5 determines whether or not the match rate is equal to or larger than the predetermined threshold value (S55) are the same as in the first embodiment. The client verification unit 54, if the match rate is equal to or larger than the predetermined threshold value (S55; YES), requests the cache management unit 57 for the shortest storage period about the user by designating the user ID of the specified user. The client verification unit 54 acquires the shortest storage period about the user, i.e., a period till a point of time (authenticating point of time) since the storage date/time of the latest cache biometric data of the user from the cache management unit 57.

The client verification unit 54 determines whether or not the acquired shortest storage period becomes equal to or larger than the predetermined period (S120). The client verification unit 54, if the shortest storage period is equal to or larger than the predetermined period (S120; YES), obtains the evaluation request for the authentication request sent to the server 1 (S121). Note that the client verification unit 54, whereas if the shortest storage period is not equal to or larger than the predetermined period (S120; NO), does not get the evaluation request to be contained in the authentication request similarly to the first embodiment.

Subsequently, the client verification unit 54, similarly to the first embodiment, transmits the authentication request to the server 1 (S57). At this time, the client verification unit 54, if the evaluation request is not contained in the authentication request, in the same way as in the first embodiment, transmits the authentication request containing the user ID and the match feature point information to the server 1. Whereas if the evaluation request is contained in the authentication request, the client verification unit 54 transmits the temporary biometric data also in addition to the user ID and the match feature point information to the server 1 (S57).

The server verification unit 12 of the server 1, similarly to the first embodiment, verifies the reference biometric data of the authentication request target user with the match feature points sent from the client 5 in response to the authentication request transmitted from the client 5 (S58). The server verification unit 12, upon completion of this verification, determines whether the authentication request contains the evaluation request or not (S122). The server verification unit 12, if the evaluation request is contained therein (S122; YES), evaluates the temporary biometric data contained in the authentication request together with the evaluation request (S123).

This evaluation process is as explained in the second embodiment. Namely, the server verification unit 12 extracts the reference biometric data of the authentication request target user from the biometric data registering unit 15, and verifies this reference biometric data with the temporary biometric data sent together with the authentication request. The server verification unit 12 calculates the match rate as the evaluation result.

The server verification unit 12, similarly to the first embodiment, notifies the client 5 of the authentication result which uses the match feature points sent from the client 5 (S59). The server verification unit 12 in the third embodiment, however, if the evaluation request is contained in the authentication request, notifies the client 5 of the match rate as the evaluation result together with the authentication result (S59).

The client verification unit 54 instructs, similarly to the first embodiment, the authentication result notifying unit 56 to output the success or the failure of the authentication corresponding to this authentication result (S60, S61, S62).

In the third embodiment, further, the client verification unit 54 determines whether the notification given from the server 1 contains the evaluation result or not (S124). The client verification unit 54, if the evaluation result is contained (S124; YES), determines whether or not the match rate as the evaluation result is equal to or larger than the predetermined threshold value (S125). The client verification unit 54, if the match rate is equal to or larger than the predetermined threshold value (S125; YES), instructs the cache management unit 57 to cache the temporary biometric data.

The cache management unit 57, when receiving an adding instruction, determines whether or not the cache biometric data count of the target user is within the cache upper limit number (S126). The cache management unit 57, if the cache biometric data count of the target user is within the cache upper limit number (S126; YES), adds the entry containing the temporary biometric data and the match rate to the cache unit 58 (S127). Whereas if the cache biometric data count of the target user exceeds the cache upper limit number (S126; NO), the cache management unit 57 deletes the entry containing the cache biometric data exhibiting the lowest match rate in all the cache biometric data of the target user (S128). The cache management unit 57 thereafter adds the entry containing the temporary biometric data and the match rate to the cache unit 58 (S127).

<<Operation and Effect of Third Embodiment>>

In the biometric authentication system of the third embodiment, in the client 5, the plural sets of cache biometric data about the individual users are cached, and all the cache biometric data are employed in the one-to-many biometric authentication for identifying the users.

In the third embodiment, the current temporary biometric data is evaluated in relation to the reference biometric data in the server 1, and, if the match rate as this evaluation result is equal to or larger than the predetermined threshold value, the addition of the cache biometric data is permitted. With this permission, only the temporary biometric data with a fixed level of quality being ensured is added as the cache biometric data.

Further, in the third embodiment, the match rates with respect to the respective sets of cache biometric data are also retained. In the case of exceeding the cache biometric data count that can be held by the single user, after deleting the cache biometric data exhibiting the lowest match rate, and the current temporary biometric data is added as the cache biometric data.

With these contrivances, it is feasible to retain the plural sets of high-quality cache biometric data about the individual users. Moreover, for example, a dispersion of the biometric data, which varies periodically due to factors such as the seasons, can be absorbed by employing the cache biometric data reflecting the plural sets of past biometric information. For instance, the user exhibiting a large variation in biometric information between the summer and the winter can be properly authenticated by retaining the respective sets of cache biometric data in which the sets of biometric information in the summer and the winter. As a result, it is possible to prevent the identical person rejection rate from rising, which accompanies the change in biometric data. Moreover, the cache biometric data with the high quality is retained, and hence the different person acceptance rate can be maintained.

Further, in the third embodiment, if the period till the authenticating point of time since the storage date/time of the latest cache biometric data becomes equal to or longer than the predetermined period, the addition of the temporary biometric data as the cache biometric data is permitted.

With this addition, even in the case of the user whose biometric information varies with the time, the dispersion can be absorbed by using the cache biometric data in which the past biometric information is reflected, and the identical person rejection rate can be prevented from rising.

[Fourth Embodiment]

The biometric authentication system in a fourth embodiment further includes a process of using the cache biometric data retained on the client 5 for another client device, which was not mentioned in the embodiments described above. The following discussion will demonstrate an example of adding a mode peculiar to the fourth embodiment to the mode of the first embodiment by way of the biometric authentication system in the fourth embodiment. The present embodiment is not, however, limited to such a mode, and the mode peculiar to the fourth embodiment may be added to the modes of the second and third embodiments. It should be noted that another client device has the same configuration as the client 5 has.

FIG. 13 is a block diagram illustrating an outline of an architecture of the biometric authentication in the fourth embodiment. As depicted in FIG. 13, in the fourth embodiment, the client 5 further includes a recording medium control unit 131, and the server 1 further includes a cache biometric data temporary retaining unit 132.

In the client 5, the cache management unit 57, when receiving a cache biometric data transfer instruction via a user interface (not illustrated) of the client 5, extracts at least one set of cache biometric data and the user ID that are retained on the cache unit 58. The cache management unit 57, if the server 1 is designated as a transfer destination, transmits the extracted cache biometric data and user ID to the server 1 via the client communication unit 59. The cache management unit 57, if a recording medium such as a USB (Universal Serial Bus) memory, a floppy (registered trademark) disc and an MO (Magneto Optical) disc is designated as the transfer destination, sends the extracted cache biometric data and user ID to the recording medium control unit 131.

On the other hand, the cache management unit 57, when receiving the cache biometric data and the user ID that are retained on another client 5 from the server 1 or the recording medium, stores the received cache biometric data and user ID on the cache unit 58. The cache biometric data and the user ID each sent from the server 1 are received via the client communication unit 59, and the cache biometric data and the user ID each sent from the recording medium are received via the recording medium control unit 131. The cache biometric data thus transferred may be targeted at all the data and may also be targeted at the cache biometric data of the designated user.

In the server 1, a cache biometric data temporary retaining unit 132 is stored with the cache biometric data and the user ID that are transmitted from the client 5. The biometric data management unit 11, when receiving the transmission request of the cache biometric data from the client 5, extracts the transmission request target cache biometric data and user ID from the cache biometric data temporary retaining unit 132, and transmits the extracted cache biometric data and user ID to the client 5.

<<Operation and Effect of Fourth Embodiment>>

In the biometric authentication system in the fourth embodiment, the cache biometric data retained in the client 5 is transmitted to another client via a portable recording medium or the server 1 and is retained in another client. With this contrivance, even when changing the client used by the user, the cache biometric data is shared with another client 5 after being changed, and therefore the authentication can be conducted in the same way as by the pre-change client.

[Fifth Embodiment]

The biometric authentication system in a fifth embodiment further includes a process in the case of updating or deleting the reference biometric data in the server 1, which was not mentioned in the respective embodiments. The following discussion will demonstrate an example of adding a mode peculiar to the fifth embodiment to the mode of the first embodiment by way of the biometric authentication system in the fifth embodiment. The present embodiment is not, however, limited to such a mode, and the mode peculiar to the fifth embodiment may be added to the modes of the second, third and fourth embodiments.

FIG. 14 is a diagram depicting an example of the biometric data registering unit 15 in the fifth embodiment. The biometric data registering unit 15 is, as depicted in FIG. 14, stored with a registration date/time of the reference biometric data about the reference biometric data of each user ID, respectively.

In the server 1, the biometric data management unit 11 makes management of how the reference biometric data stored in the biometric data registering unit 15 is registered, updated and deleted. The biometric data management unit 11 receives a request for registering, updating and deleting the reference biometric data from the user interface (not illustrated) of the server 1 and another device.

The biometric data management unit 11, when receiving a registration request, stores the reference biometric data, the user ID and the registration date/time each acquired together with the request in the biometric data registering unit 15. Moreover, the biometric data management unit 11, when receiving an update request, stores the reference biometric data, the user ID and the update date/time each acquired together with the request in the biometric data registering unit 15. To be specific, the registration date/time or the update date/time is set in a registration date/time field of the biometric data registering unit 15. On the other hand, the biometric data management unit 11, when receiving a delete request, deletes the reference biometric data specified by the user ID that is acquired together with the request from the biometric data registering unit 15.

The biometric data management unit 11, when deleting the reference biometric data, notifies the client 5 of a purport that the reference biometric data has been deleted together with the user ID of the user associated with this deleted data.

The server verification unit 12, when receiving the authentication request from the client 5, extracts the registration date/time of the reference biometric data specified by the user ID contained in this authentication request from the biometric data registering unit 15, and compares cache date/time information contained in this authentication request with the extracted registration date/time information. The server verification unit 12, when determining from this comparison that the registration date/time is more recent than the cache date/time, recognizes that the reference biometric data has been just updated. The server verification unit 12 notifies the client 5 of an update flag indicating the update being done together with the authentication result in the same authentication process as in the first embodiment.

Further, the server verification unit 12, when receiving the evaluation request from the client 5 as a consequence upon transmitting the update flag, similarly to the second embodiment, evaluates the temporary biometric data contained in this evaluation request. This evaluation process is the same as in the second embodiment, and its description is therefore omitted herein.

FIG. 15 is a diagram illustrating an example of the cache unit 58 in the fourth embodiment. The cache unit 58 is, as depicted in FIG. 15, stored with a cache date/time of the cache biometric data with respect to the cache biometric data of each user ID, respectively. The cache management unit 57, when caching the temporary biometric data in the cache unit 58, stores the date/time thereof together with the temporary biometric data on the cache unit 58.

The cache management unit 57, when receiving the notification from the server 1 and if this notification indicates the deletion of the biometric data, deletes the cache biometric data specified by the user ID received together with the notification from the cache unit 58. On the other hand, the cache management unit 57, when receiving the update flag with the authentication result and if this authentication result indicates the success in authentication, executes the process of updating the cache biometric data on the basis of the update flag.

Specifically, the cache management unit 57, when receiving the update flag, recognizes that the reference biometric data of the target user related to the authentication result has been updated, and transmits the evaluation request containing the user ID and the temporary biometric data of the target user to the server 1. The cache management unit 57, upon receiving the evaluation result from the server 1 and if this result is satisfactory, updates the cache biometric data in the cache unit 58 with the temporary biometric data. Note that if the plural sets of cache biometric data about each individual user are retained as in the third embodiment, after deleting all of the plural sets of cache biometric data of the target user, the temporary biometric data thereof is added to the cache unit 58.

[Operational Example]

Figure 16A:
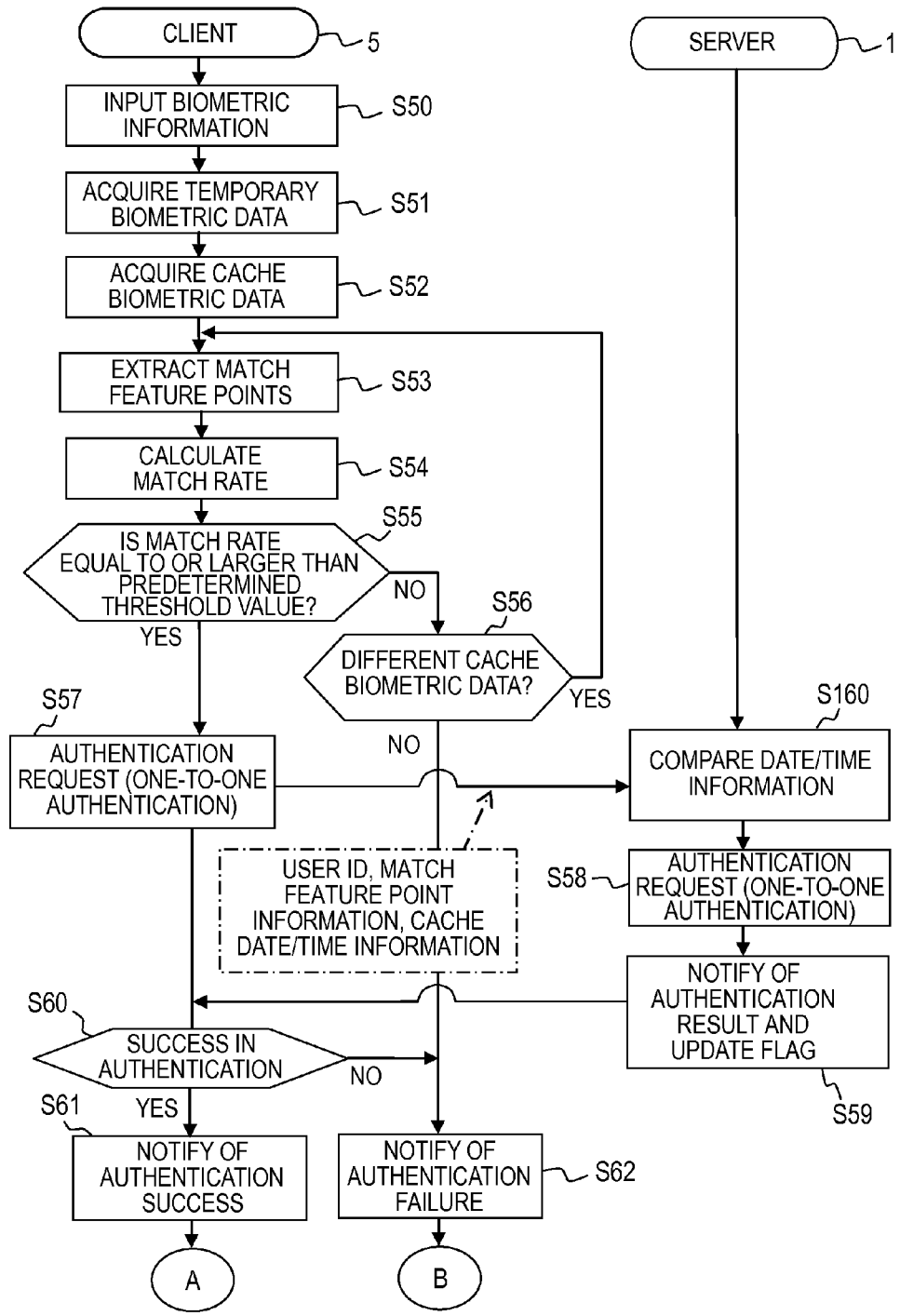
FIG. 16A is a flowchart illustrating an operational example of the biometric authentication system in a fifth embodiment.
Figure 16B:
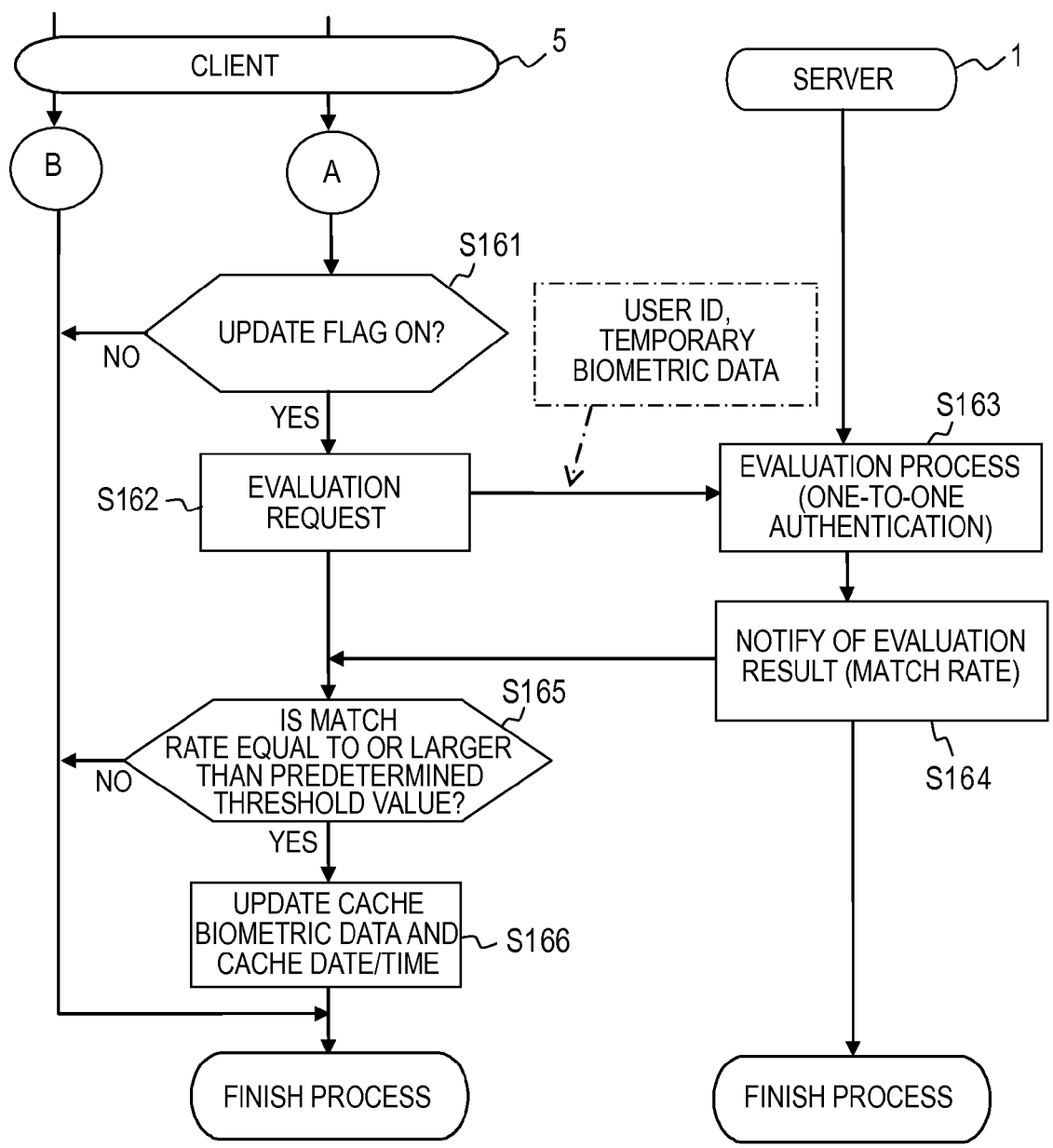
FIG. 16B is a flowchart illustrating the operational example of the biometric authentication system in the fifth embodiment.

An operational example of the biometric authentication system in the fifth embodiment will hereinafter be described by use of FIGS. 16A and 16B. FIGS. 16A and 16B are flowcharts illustrating the operational example of the biometric authentication in the fifth embodiment.

The operation is the same as in the first embodiment till the client verification unit 54 of the client 5 identifies the user by verifying the temporary biometric data with the cache biometric data, and transmits the authentication request to the server 1 (S57). In the fifth embodiment, the client verification unit 54 gets this authentication request to further contain cache date/time information of the cache biometric data.

The server verification unit 12 of the server 1, upon receiving the authentication request sent from the client 5, compares the registration date/time of the reference biometric data specified by the user ID contained in this authentication request with the cache date/time information (S160). The server verification unit 12, when determining from this comparison that the registration date/time is more recent than the cache date/time, recognizes that the reference biometric data has been just updated. The server verification unit 12 notifies the client 5 of the update flag together with the authentication request in the same authentication process (S58) as in the first embodiment (S59).

The client verification unit 54, similarly to the first embodiment, receives the authentication result and instructs the authentication result notifying unit 56 to output this authentication result (S61 or S62).

Subsequently, the client verification unit 54 makes the determination about the update flag sent together with the authentication result (S161). The client verification unit 54, if the update flag indicates that the update is done (set ON) (S161; YES), transmits the evaluation request of the temporary biometric data to the server 1 (S162). The client verification unit 54 gets this evaluation request to contain the temporary biometric data and the user ID.

The server verification unit 12, when receiving this evaluation request, extracts the reference biometric data specified by the user ID contained in the evaluation request from the biometric data registering unit 15, and verifies the reference biometric data with the temporary biometric data contained in the evaluation request (S163). The server verification unit 12 calculates, as the evaluation result, the match rate by the same technique as by the client verification unit 54 in the first embodiment on the basis of the feature points contained in the reference biometric data and the feature points contained in the temporary biometric data (S163). The server verification unit 12 notifies the client 5 of this match rate as the evaluation result (S164).

The client verification unit 54, when receiving the match rate sent as the evaluation result, determines whether or not this match rate becomes equal to or larger than the predetermined threshold value (S165). The client verification unit 54, if the match rate becomes equal to or larger than the predetermined threshold value (S165; YES), determines that the cache biometric data is to be updated, and sends the temporary biometric data to the cache management unit 57. Note that the client verification unit 54, whereas if the match rate does not become equal to or larger than the predetermined threshold value (S165; NO), terminates the process in the as-is status without updating the data. Incidentally, an implication that the match rate becomes equal to or larger than the predetermined threshold value is that the evaluation result is satisfactory.

The cache management unit 57, upon receiving the user ID and the temporary biometric data together with the update instruction from the client verification unit 54, updates the cache biometric data specified by the user ID in the cache unit 58 with the temporary biometric data (S166). At this time, the cache management unit 57 stores the update date/time thereof as the cache date/time in the cache unit 58 (S166).

<<Operation and Effect of Fifth Embodiment>>In the biometric authentication system in the fifth embodiment, when the reference biometric data of a certain user is deleted in the server 1, the server 1 notifies the client 5 of this purport, and the cache biometric data of this user retained in the client 5 is likewise deleted. With this contrivance, consistency of the biometric data between the server 1 and the client 5 is ensured, and it is possible to restrain an extra rise of the processing load in the one-to-many biometric authentication because of unnecessary biometric data not being cached in the client 5.

Moreover, even when updating the reference biometric data of a certain user in the server 1, the cache date/time of the cache biometric data is compared with the registration date/time of the reference biometric data, thereby detecting the update thereof. When detecting the update, the server 1 notifies the client 5 of this purport, and the cache biometric data retained in the client 5 is updated with the temporary biometric data. With this update, the consistence of the biometric data between the server 1 and the client 5 can be ensured. As a result, it is feasible to prevent beforehand the identical person rejection rate from rising due to the update of the reference biometric data.

[Modified Example]

In the respective embodiments discussed above, the client verification unit 54 obtains the match rate on the occasion of verifying the temporary biometric data with the cache biometric data retained in the cache unit 58, and determines the verification to be successful when this match rate becomes equal to or larger than the predetermined threshold value. In other words, the authentication target user is identified by the user ID stored together with the cache biometric data of which the match rate with the temporary biometric data becomes equal to or larger than the predetermined threshold value. The success or the failure of the verification may also be, however, determined corresponding to the number of the match feature points without calculating the match rate.

Figure 17:
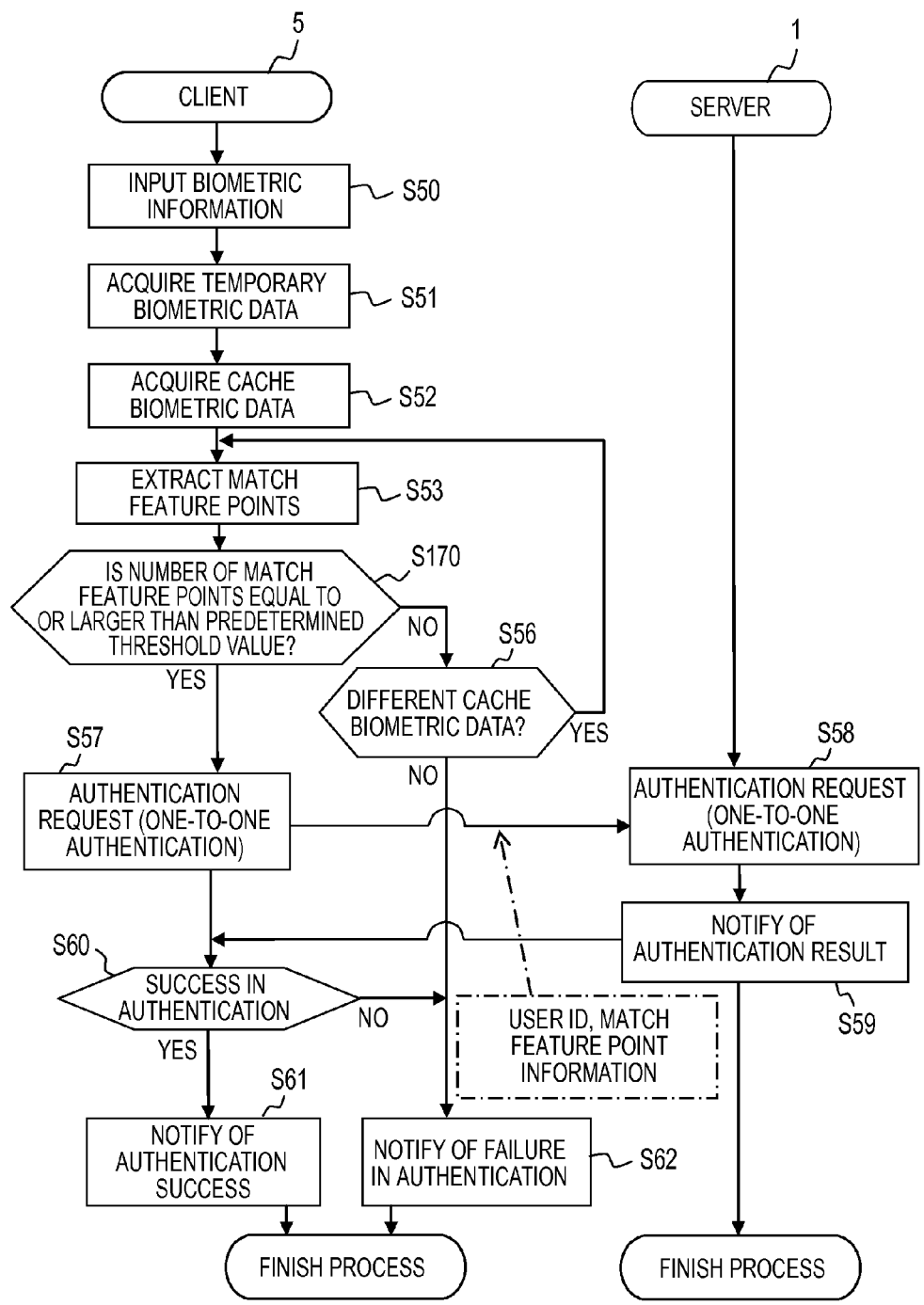
FIG. 17 is a flowchart illustrating an operational example of the biometric authentication system in a modified example.

FIG. 17 is a flowchart illustrating an operational example of the biometric authentication system in a modified example. In the modified example, the biometric data synthesizing unit 55 sends the match feature point information to the client verification unit 54 without calculating the match rate. The client verification unit 54, as depicted in FIG. 17, determines whether or not the number of the match feature points is equal to or larger than the predetermined threshold value (S170). The client verification unit 54, if the number of the match feature points is equal to or larger than the predetermined threshold value (S170; YES), determines that the verification of the temporary biometric data with the cache biometric data gets successful. Other processes are the same as those in the respective embodiments discussed above, and hence their descriptions are omitted.

According to this modified example, the process of calculating the match rate can be omitted, so that the processing load can be reduced. Though the accuracy is inferior to the case of using the match rate, it is possible to prevent the identical person rejection rate from rising due to deformations such as scuffs applied to the living body.

Moreover, in the respective embodiments discussed above, in the case of transmitting the evaluation request of the temporary biometric data to the server 1 from the client 5, the server verification unit 12 calculates the match rate between the temporary biometric data and the reference biometric data as the evaluation result. As a result, if the match rate becomes equal to or larger than the predetermined threshold value, the evaluation result is determined to be satisfactory. The number of the match feature points may also be, however, used as the evaluation result without calculating the match rate. In this case, though the match rate is transmitted and received as the evaluation result in the respective embodiments described above, the number of the match feature points as a substitute for the match rate may be transmitted and received as the evaluation result.

[Others]

<Concerning Hardware Components and Software Components>

The hardware components represent hardware circuits and are exemplified by an Field Programmable Gate Array (FPGA), an Application Specific Integrated Circuit (ASIC), a gate array, a combination of logic gates, a signal processing circuit and an analog circuit.

The software components are parts (code segments) for realizing the processes by way of the software but do not imply concepts that limit languages and development environments for realizing the software. The software components are exemplified by a task, a process, a thread, a driver, firmware, a database, a table, a function, a procedure, a subroutine, a predetermined module of program codes, a data structure, an array, a variable and a parameter. These software components are realized on one or a plurality of memories (one or a plurality of processors (e.g., a CPU (Central Processing Unit), a DSP (Digital Signal Processor), etc).

It should be noted that each embodiment discussed above does not limit the methods of realizing the processing unit described above. It may be sufficient that the processing units are configured by the methods which can be actualized by the ordinary engineers in the field of the present technology as the hardware components or the software components or combinations of these components.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

DESCRIPTION OF THE REFERENCE NUMERALS AND SYMBOLS

1 biometric authentication server device (server)
5 client device (client)
8 network
11 biometric data management unit
12 server verification unit
13 server communication unit
15 biometric data registering unit
51 biometric information input unit
52 input control unit
53 biometric data acquiring unit
54 client verification unit
55 biometric data synthesizing unit
57 cache management unit
58 cache unit
59 client communication unit
61 match status management unit
62 match rate history storage unit
131 recording medium control unit
132 cache biometric data temporary retaining unit

What is claimed is:

1. A biometric authentication system comprising:
a server device implemented with a computer hardware, the server device being configured to store first biometric data of a plurality of users in a registering unit;
a client device implemented with a computer hardware, the client device being configured to sample biometric data received from the users, the system being configured to authenticate the sampled biometric data by use of the first biometric data registered in the registering unit,
the client device including a first processor and a first memory storing instructions that cause the first processor to execute:
retaining second biometric data of the plurality of users together with user information in a retaining unit, verifying biometric data sampled from a user among the plurality of users with the second biometric data when in authentication, synthesizing information of the second biometric data of which verification is successful and the biometric data sampled from the user, and transmitting user information of biometric data of which the verification is successful and the synthesized information to the server device, the server device including a second processor and a second memory storing instructions that cause the second processor to execute:

verifying biometric data specified by the user information sent from the client device in plural sets of the first biometric data registered in the registering unit with the synthesized information sent from the client device, wherein the second biometric data related to the synthesized information is retained in the retaining unit when the verification with the synthesized information by the server device is successful, wherein the first processor further executes:

extracting information on feature points from the biometric data of the user, selecting match feature points getting matched under predetermined conditions with feature points contained in the second biometric data from the extracted feature points, determining whether or not the verification gets successful or unsuccessful by use of the information on the selected match feature points, organizing the information on the match feature points into the synthesized information, determining such a polygonal area as to embrace all the match feature points and to minimize an area on the basis of the match feature point information, and calculating, as a match rate, a rate of the match feature points to all the feature points embraced in the polygonal area, wherein the first processor executes, if the calculated match rate exceeds a predetermined threshold value, determining that the verification becomes successful, wherein the second processor further executes:

storing a history of the match rates together with time information with respect to each user;

calculating a variation quantity of the match rate on the basis of the stored match rate history and the stored time information and monitoring that the variation quantity of the match rate reaches a predetermined decrease status; and notifying the client device that the match rate variation quantity about the user whose biometric data is authenticated reaches the predetermined decrease status, and the first processor further executes updating, when the server device notifies the client device that the match rate variation quantity about the user reaches the predetermined decrease status, the second biometric data with the biometric data sampled from the user.

2. The biometric authentication system according to claim 1, wherein the second processor further executes:

evaluating, when receiving the biometric data from the client device, the biometric data received using the first biometric data registered in the registering unit and sending an evaluation result back to the client device, and the first processor executes, when the server device notifies the client device that the match rate variation quantity about the user reaches the predetermined decrease status, transmitting the biometric data sampled from the user to the server device, and determining based on the evaluation result sent back from the server device whether the second biometric data is updated or not.

3. The biometric authentication system according to claim 1, wherein the first processor further executes:

determining whether or not the biometric data sampled from the user is added as the second biometric data, and adding, when the determining indicates the sampled data added as the second biometric data, the biometric data sampled from the authentication target user in addition to the already-retained second biometric data about the authentication target use.

4. The biometric authentication system according to claim 3, wherein the second processor further executes:

evaluating, when receiving the biometric data sampled from the authentication target user from the client device, the received biometric data by use of the first biometric data registered in the registering unit and to send an evaluation result back to the client device, and the first processor further executes:

transmitting, in addition to the user information and the synthesized information, the biometric data sampled from the authentication target user to the server device, and determining based on the evaluation result sent back from the server device whether or not biometric data sampled from the authentication target user is added as the second biometric data.

5. The biometric authentication system according to claim 4, wherein the first processor executes retaining in the retaining unit plural sets of the second biometric data together with the evaluation result by the second processor, and the first processor executes deleting the second biometric data of which the evaluation result is unsatisfactory so that a data count of the second biometric data, retained by the retaining unit, about the authentication target user does not reach a predetermined upper limit number, and thereafter determining that the biometric data sampled from the authentication target user is added as the second biometric data.

6. The biometric authentication system according to claim 5, wherein the first processor further executes retaining in the retaining unit final retaining time of the second biometric data about each user, and the first processor executes, when a period since the final retaining time about the authentication target user exceeds a predetermined period, determining that the biometric data sampled from the authentication target user is added as the second biometric data.

7. The biometric authentication system according to claim 1, wherein first processor executes retaining in the retaining unit cache date/time information together with the second biometric data about each user, the second processor executes in the registering unit registration date/time information together with the first biometric data, and the second processor executes determining whether the biometric data stored in the registering unit is updated or not by comparing the cache date/time information with the registration date/time information when in authentication, and notifying, when determining that the biometric data is updated, the client device of a purport of this update.

8. The biometric authentication system according to claim 1, wherein the second processor further includes executes notifying, when the first biometric data stored in the registering unit is deleted, the client device that the biometric data has been deleted together with the user information of this deleted biometric data, and the first processor executes, when receiving the notification of the deletion of the biometric data from the server device, deleting the second biometric data specified by the user information sent together with this notification from the retaining unit.

9. The biometric authentication system according to claim 1, wherein the first processor executes transmitting the second biometric data retained in the retaining unit to the server device, and the second processor further executes the second biometric data transmitted from the client device to another client device.

10. The biometric authentication system according to claim 1, wherein the first processor further executes:

recording the second biometric data retained in the retaining unit on a portable recording medium, and retaining in the retaining unit the second biometric data read from the portable recording medium.

11. A biometric authentication method executed by a biometric authentication system including a server device to store first biometric data of a plurality of users in a registering unit; and a client device to retain second biometric data of the plurality of users in a retaining unit together with user information, the biometric authentication method comprising:

verifying biometric data sampled from a user among the plurality of users with the second biometric data retained in the retaining unit, wherein the second biometric data is retained in the retaining unit when the server device authenticates the second biometric data by use of the first biometric data and the authentication is successful;

acquiring synthesized information of the second biometric data of which verification is successful and the biometric data sampled from the user; and authenticating the synthesized information by use of the first biometric data specified by the user information of the biometric data of which the verification is successful in plural sets of the first biometric data registered in the registering unit, wherein a first processor of the client device executes:

extracting information on feature points from the biometric data of the user, selecting match feature points getting matched under predetermined conditions with feature points contained in the second biometric data from the extracted feature points, determining whether or not the verification gets successful or unsuccessful by use of the information on the selected match feature points, and organizing the information on the match feature points into the synthesized information, determining such a polygonal area as to embrace all the match feature points and to minimize an area on the basis of the match feature point information; and calculating, as a match rate, a rate of the match feature points to all the feature points embraced in the polygonal area, wherein the first processor executes, if the calculated match rate exceeds a predetermined threshold value, determining that the verification becomes successful.

wherein a second processor of the server device executes:

storing a history of the match rates together with time information with respect to each user;

calculating a variation quantity of the match rate on the basis of the stored match rate history and the stored time information and monitoring that the variation quantity of the match rate reaches a predetermined decrease status; and notifying the client device that the match rate variation quantity about the user whose biometric data is authenticated reaches the predetermined decrease status, and the first processor further executes updating, when the server device notifies the client device that the match rate variation quantity about the user reaches the predetermined decrease status, the second biometric data with the biometric data sampled from the user.

* * * * *

UNITED STATES PATENT AND TRADEMARK OFFICE
CERTIFICATE OF CORRECTION

| | | |
|---|---|---|
| PATENT NO. | : 9,071,602 B2 | Page 1 of 1 |
| APPLICATION NO. | : 13/492242 | |
| DATED | : June 30, 2015 | |
| INVENTOR(S) | : Ken Kamakura | |

It is certified that error appears in the above-identified patent and that said Letters Patent is hereby corrected as shown below:

In the claims

Claim 11, Column 28, Line 23 (Approximately)

Delete "successful." and insert --successful,--, therefor.

Signed and Sealed this
Twenty-seventh Day of October, 2015

Michelle K. Lee
*Director of the United States Patent and Trademark Office*